(12) United States Patent
Clarke

(10) Patent No.: US 7,439,970 B1
(45) Date of Patent: Oct. 21, 2008

(54) COMPUTER GRAPHICS

(75) Inventor: Timothy John Clarke, London (GB)

(73) Assignee: Elixir Studios Limited (GB)

( * ) Notice: Subject to any disclaimer, the term of this patent is extended or adjusted under 35 U.S.C. 154(b) by 1195 days.

(21) Appl. No.: 10/111,960

(22) PCT Filed: Nov. 2, 2000

(86) PCT No.: PCT/GB00/04212

§ 371 (c)(1),
(2), (4) Date: Apr. 29, 2002

(87) PCT Pub. No.: WO01/33509

PCT Pub. Date: May 10, 2001

(30) Foreign Application Priority Data

Nov. 2, 1999 (GB) ............................ 9925947.5
Jun. 9, 2000 (GB) ............................ 0014150.7

(51) Int. Cl.
*G06T 15/00* (2006.01)
(52) U.S. Cl. .................. 345/419; 345/420; 345/421; 345/427; 345/428
(58) Field of Classification Search ............. 345/419, 345/420, 421, 427, 428
See application file for complete search history.

(56) References Cited

U.S. PATENT DOCUMENTS 4,694,404 A * 9/1987 Meagher .................. 345/421
5,613,049 A * 3/1997 Brechner et al. ............. 345/420
6,222,937 B1 * 4/2001 Cohen et al. ................. 382/154

FOREIGN PATENT DOCUMENTS

| EP | 0311081 A2 | 4/1989 |
| GB | 2284526 A | 6/1995 |
| WO | WO 98/00811 | 1/1998 |
| WO | WO 98/47107 A1 | 10/1998 |

OTHER PUBLICATIONS

Mike Krus, Patrick Bourdot, Francoise Guisnel and Guillaume Thibault, Levels of Detail & Polygonal Simplification, *ACM Crossroads Student Magazine*, Copyright 2000-2002, ACM, Inc.

(Continued)

*Primary Examiner*—Phu K Nguyen
(74) *Attorney, Agent, or Firm*—Lerner, David, Littenberg, Krumholz & Mentlik, LLP

(57) ABSTRACT

A method of and apparatus for generating a graphical image of at least part of an object provided within a hierarchically divided region of space from a plurality of stored graphical representations, of the differently sized sub-regions of the space is described. The method comprises: determining a viewing distance between the object and a viewpoint from which the object is being viewed; and using the determined viewing distance to select, from the plurality of stored graphical representations, a graphical representation of a sub-region of the space in which at least part of the object resides, the size of the selected sub-region corresponding to the calculated viewing distance and determining the level of detail of the graphical image of at least part of the object to be generated. The method has particular application in the computer games field where creating three-dimensional simulations of the world and objects within it is highly desirable.

94 Claims, 13 Drawing Sheets

OTHER PUBLICATIONS

James H. Clark, *Hierarchical Geometric Models for Visible Surface Algorithms*, Communications of the ACM, Oct. 1976, vol. 19, No. 10.

Xavier Decoret, Gernot Schaufler, Francois Sillion and Julie Dorsey, *Multi-layered Impostors for Accelerated Rendering*, Eurographics, 1999, vol. 18, No. 3.

Paulo W. C. Maciel and Peter Shirley, *Visual Navigation of Large Environments Using Textured Clusters*, Association of Computing Machinery, 1995 Symposium on Interactive 3D Graphics.

Dieter Schmalstieg, *Lodestar: An Octree-Based Level of Detail Generator for VRML*, Vienna University of Technology, Austria., pp. 125-132, 1997.

Hugues Hoppe, *View-Dependent Refinement of Progressive Meshes*, Microsoft Research, Aug. 1997.

Bradford Chamberlain, Tony Derose, Dani Lischinski, David Salesin and John Snyder, Fast Rendering of Complex Environments Using a Spatial Hierarchy, Jul. 24, 1995.

* cited by examiner

Until the number of merged and planar primitives equals half the maximum number of triangles allowed in the imposter:

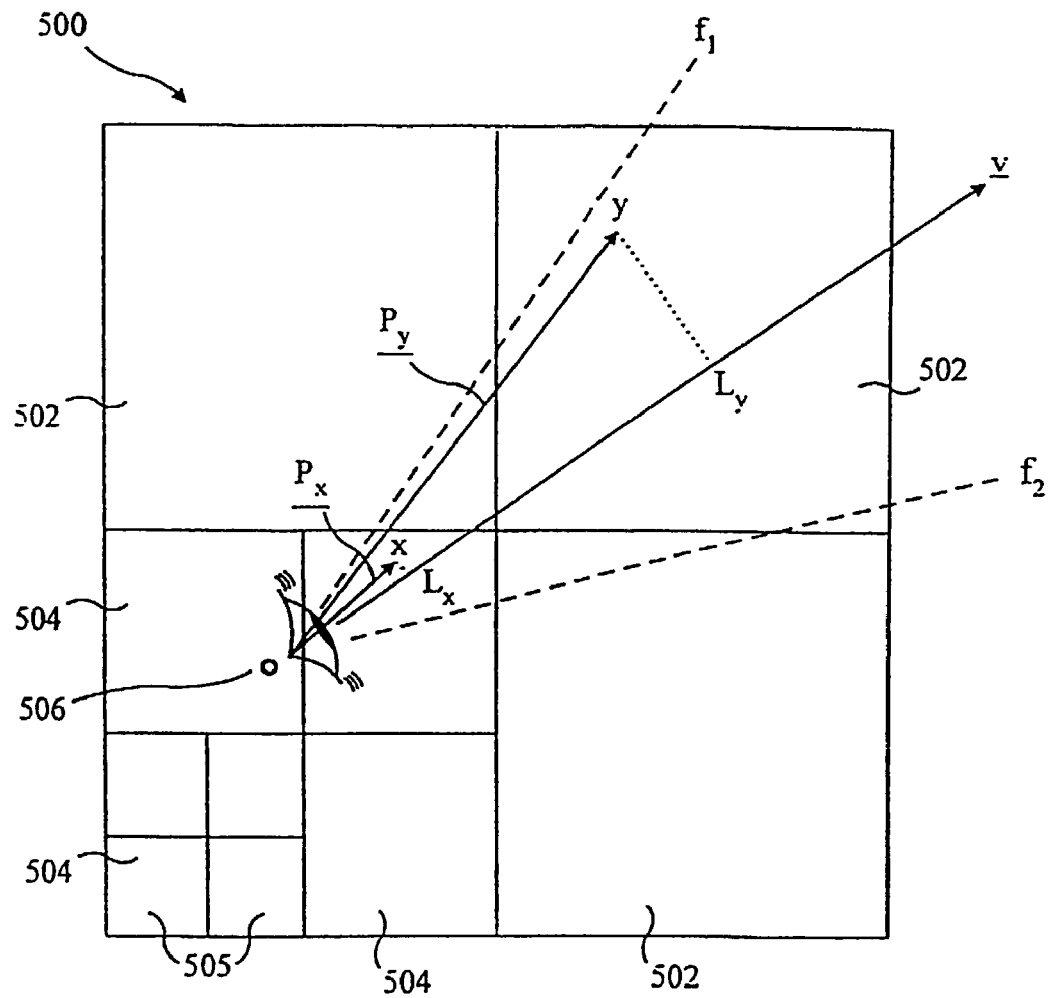
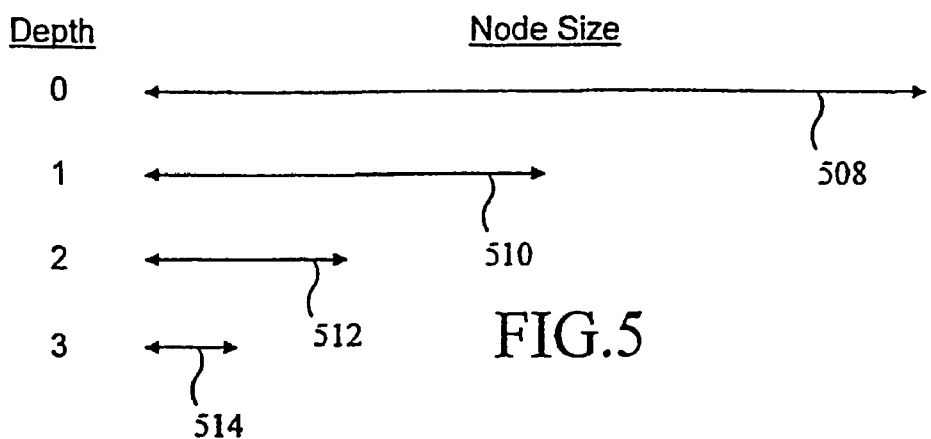
FIG.5

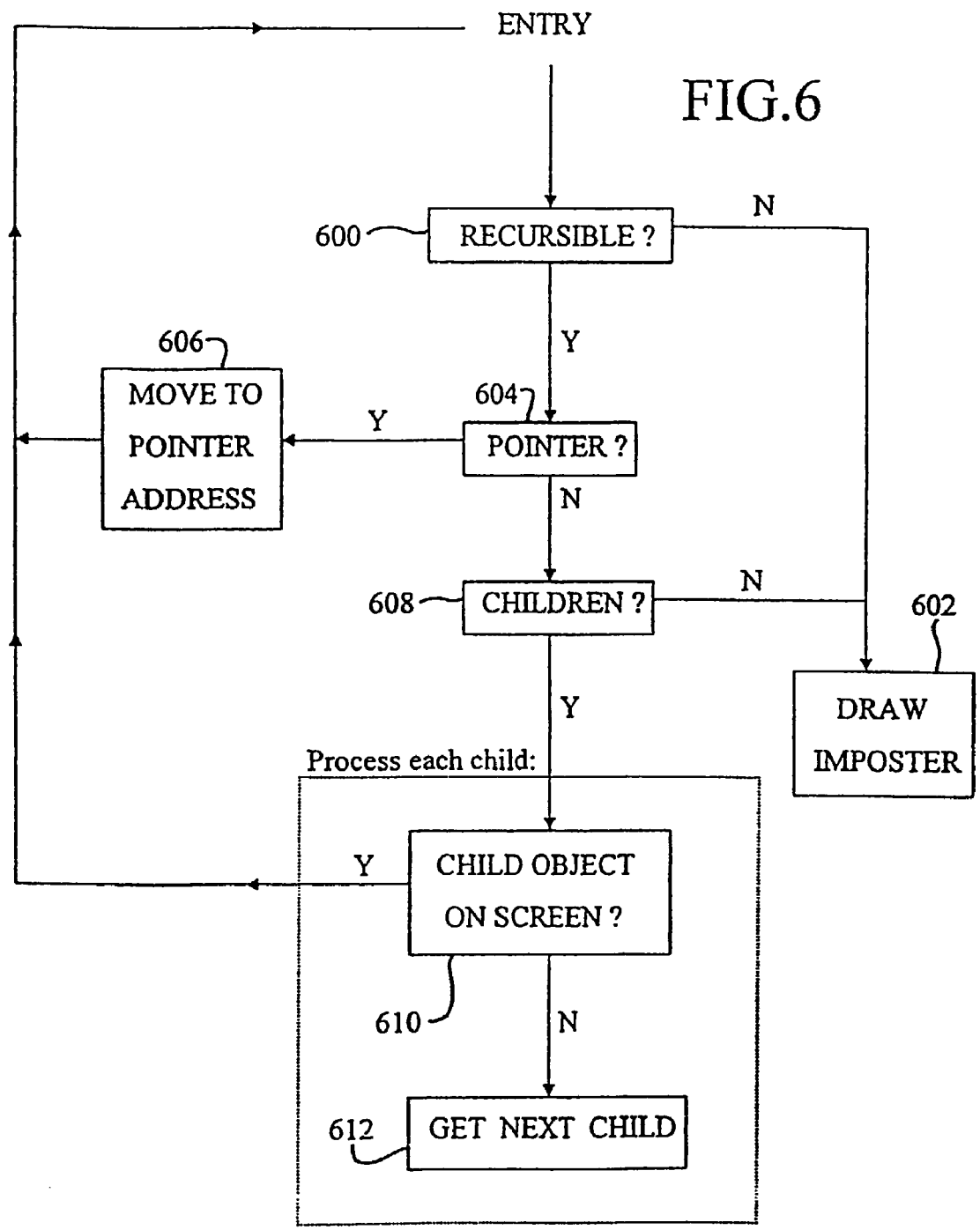

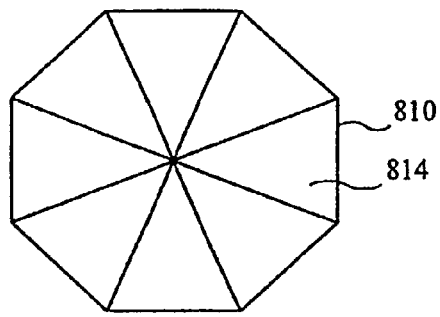
FIG.8c
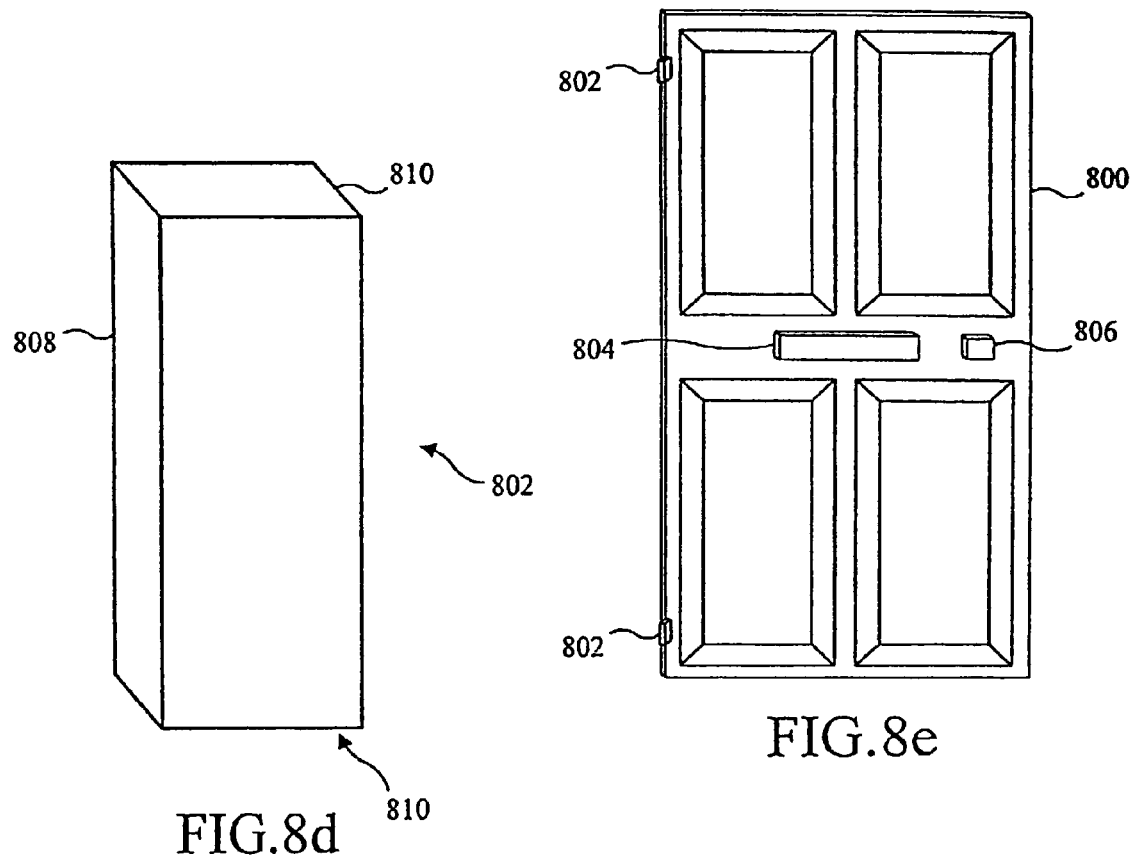
FIG.8d
FIG.8e

COMPUTER GRAPHICS

The present invention concerns improvements relating to computer graphics and more particularly, though not exclusively, the present invention relates to the production, storage and retrieval of scenes (representations of objects) from a virtual world for use in a computer game for example. The representations of objects can be imposters at different levels of detail stored within octree databases for output to a computer graphics system.

The scenes required for today's computer games or virtual reality environments are complex, with consumers demanding increasingly sophisticated simulations and more realistic computer graphics. Software games manufacturers whilst wanting to meet this demand also have to consider the processing power available to consumers. For example, computer game manufacturers normally create computer games to run on a particular minimum specification computer which is as low as possible, without detracting too greatly from the game's performance, to appeal to as large a market as possible.

Whilst the processing power of graphics hardware systems shows marked improvements each year, the inherent limit on the processing power of any one system to be used for displaying computer graphics leads to a harsh compromise between the complexity of graphics frames and the detail in which they are drawn. The number of objects which can be output simultaneously in any one frame is usually restricted to some practical maximum, in order to deliver the frame within the time period dictated by the draw frame rate. An object is a graphical representation of a distinct entity, such as a building or a person, by means of a mesh formed from primitives. The primitives are simple elements, such as polygons, which are joined together in well-defined ways and can be manipulated by a graphics software program.

One well documented approach to the problem of frame complexity versus object detail is to substitute simpler versions, or imposters, of the objects wherever feasible (see, for example, Clark "Hierarchical Geometric Models for Visible Surface Algorithms" in Communications of the ACM 1976). Imposters are typically employed for those objects which are of least visual significance to a particular frame. For example quickly moving objects, objects which are far away from the viewer or objects which lie in the viewer's peripheral vision may all be readily represented by imposters with no due loss of quality suffered by the frame. In this way the processing time allocated by a graphics engine to each object in a frame is kept in proportion with the object's visual importance to the frame. This allows more processing time to be devoted to those objects of higher visual significance and consequently they can be drawn in greater detail. Imposter representations of objects, or groups of objects, may be generated in a variety of ways, as discussed below.

One known method of creating imposters is for a graphics designer to create different versions of an object using off-line resources, each version being drawn to a differing degree of detail. However, this draws heavily on human resources and so is expensive and time-consuming. Another drawback is that the imposter of minimum complexity for any object is imposed by the graphics designer, being drawn to the level of detail that they deem most appropriate. This finite minimum complexity places an upper limit on the number of objects that can be drawn in any one frame, which is not always acceptable. There are further problems concerning imposter representations for large objects. A large object may require an imposter representation comprised of different complexity zones, each having a different level of detail that is to be displayed. For example, when a juggernaut is viewed from besides the driver's cab it will be possible to distinguish the tread marks on the front tyres of the vehicle, but not those on the back tyres. Similarly, any visible defects, such as rust or dents, will be seen in the bodywork of the cab but not the trailer. Ideally imposters for a single object would be created to reflect these different complexity zones. However, it is not practically possible to create imposters which reflect these changes in complexity for large objects and so each imposter is restricted to a single complexity level. Imposters showing the highest level of detail required for a particular complexity zone are therefore relatively expensive to process as the whole object has to be drawn to that complexity level. The graphics produced by this method also tend to suffer from temporal discontinuities as objects approach, or recede from, the viewpoint because of a general insufficiency in the number of imposter representations.

The human resource costs are reduced significantly if the imposters are generated dynamically. A given object can be simplified by reducing its number of constituent polygons and regenerating its mesh framework. However, the remeshing process is only effective for a relatively smooth, or flat, area of an object and, for it to be successful, all of the polygons in a particular area must share the same material properties, such as reflectance and colour. Hence, this method is highly dependent upon the specification of the objects which are input into the simplification procedures and image degradation tends to occur at a very early stage. As in the previously described prior art method, an upper limit exists on the number of objects which can be drawn in any one frame due to the minimum complexity imposed on many objects by their shape.

If the objects themselves are generated dynamically, using mathematical formulae, the same problems apply as for the dynamic imposter generation. Only a very limited range of objects is suitable for this type of generation—real-time spline tessellation, for example, will only successfully generate large, smooth rounded object areas.

A further method of creating imposters renders the background of a virtual scene and then samples it dynamically to produce a low resolution mesh and/or a texture map from which more detailed imposters for the foreground are derived. Thus, instead of producing a progression of level of detail zones this approach employs a single near/far split between zone complexity. However, frequent dynamic sampling of the updated mesh/texture map is required, making it an expensive method in terms of processing time and, again, placing a practical limit on the number of objects that can be drawn in any one frame. Huge file sizes are involved—typically of the order of gigabytes for a virtual world model of megabyte size. Also, the resolution of such imposters can be poor because they are created from sampled representations using predefined viewing conditions. If the viewing conditions do not conform to those which have been predefined, large visual discontinuities can occur and this is typically the case when a virtual world is traversed. In addition to all of the above real-time problems, the preprocessing required to produce an initial background mesh suitable for sampling and subsequent imposter generation can run into days.

A recent example of the above method (see Decoret et al. "Multi-layered Imposters for Accelerated Rendering" Eurographics 1999) employs pre-generated imposters of low resolution and dynamically updates them according to the available processing power, producing so-called multi-mesh imposters. However, when a virtual environment rendered using this method is traversed the multi-mesh imposters appear disjoint and the authors acknowledge that "a more gradual transition from the near geometry to the distant representation would be desirable".

Further to generating imposter representations, the imposters need to be stored and a strategy must be employed for selecting the most appropriate imposter for an object, or group of objects, to be drawn in a particular graphics frame. Imposters should be chosen, given the confines of the available processing power and frame rate, to maximise the quality of the image that is to be displayed. A set of imposters, encompassing different levels of detail, lends itself to being stored by a hierarchical database. Hierarchical databases have a branching, tree-like, structure and the imposters are held in the tree nodes, where two or more branches of the tree meet. The highest level within a database hierarchy is known as the root node and it is from this node that all branching emerges. The root node contains the coarsest imposter representation which has the lowest rendering cost. As the branches of the tree structure are progressively traversed, the imposter representations held in the tree nodes become increasingly detailed. Eventually the leaves of the tree structure are reached from which no further branching occurs; the leaves contain the most detailed object representations stored within the tree.

One type of hierarchical database that has been used previously for storing imposter representations is an octree. An octree is a hierarchical representation of the 3-D space associated with an object or a group of objects. The basic principle of an octree is to form a cube, or bounding box, around the object of interest, such that the object is just contained within the cube, and then recursively partition parent cubes into eight smaller child cubes usually of equal size. This creates the desired multilevel hierarchy, the root level of which is given by the initial and largest cube and the cubes are referred to as the nodes of the octree. As well as storing graphical representations of objects, octrees have also been used for representing and determining relative positions of objects in graphical applications.

In addition, attempts have been made to use hierarchical structures in the generation of real-time graphical images. For example, Maciel and Shirley ("Visual Navigation of Large Environments using Textured Clusters" in ACM SIGGRAPH Symposium on Interactive 3D Graphics 1995) employ a tree structure variation of an octree, based on a bounding volume hierarchy. The objects for the system are loaded into the database and then drawable imposters are created for clusters of objects, starting from the deepest depths within the tree structure and working upwards throughout the structure to the root node. Each node containing an imposter includes information about the imposter's draw time cost, its beneficial value and heuristic information. These parameters are used, in a complicated two phase process, to select a list of imposters for display in a given frame. The size of the smallest nodes, and hence the depth of the tree structure, is specified by the user, but nodes higher up in the hierarchy are formed around clusters of objects and are therefore not of uniform or predetermined size.

The key issue when employing a tree structure database, or any other hierarchical 3-D database, is determining the appropriate imposter to be selected and output to a computer graphics display. As exemplified by the Maciel and Shirley technique, these prior art procedures have been complex, taking considerable amounts of time to find the correct representation (imposter) required to be drawn. This in turn has reduced the maximum number of objects that can be drawn within a frame for a particular processing power.

The generation of graphical images required by computer games typically relies on a computer graphics hardware system—for example as found within a personal computer. In order to better understand how graphical images are generated, a known graphics hardware system which is used to provide computer graphics is now described. A typical computer system for delivering graphics to a two-dimensional display is shown in FIG. 1. The computer system comprises a central processing unit 100, a system memory 102 and a graphics engine 106. Software for a computer game, say, including a compiled software program 104, is loaded into the system memory 102 and the program executable 112 is run on the central processing unit. When the central processing unit receives instructions for generating the primitives, from which graphical images are formed, it directs them to the graphics engine 106 for processing. The graphics engine 106 calculates the location and texture information which specifies each primitive. This information is then passed on to the graphics hardware 108 which transforms it into video signals which are output to the graphics display 110.

It is desired to overcome, or substantially reduce, at least some of the abovedescribed problems with computer graphics generation.

The present invention resides in the appreciation that it is possible to use the relative distance between an object, or group of objects, and a viewpoint, from which a virtual world is being viewed, to determine the precise location in collection of stored graphical representations of differently sized regions of space, typically a hierarchical database such as an octree, from which the appropriate level of detail representation of the object should be retrieved. This is possible because the relative viewing distance within a world can be equated to the relative size differences between the differently sized regions of space to provide an appropriate level of detail representation from the stored graphical representations.

More specifically, according to one aspect of the present invention there is provided a method of generating a graphical image of at least part of an object provided within a hierarchically divided region of space from a plurality of stored graphical representations of the differently sized sub-regions of the space, the method comprising: determining a viewing distance between the object and a viewpoint from which the object is being viewed; and using the determined viewing distance to select, from the plurality of stored graphical representations, a graphical representation of a sub-region of the space in which at least part of the object resides, the size of the selected sub-region corresponding to the calculated viewing distance and determining the level of detail of the graphical image of at least part of the object to be generated.

The inventor of the present invention considers the present invention to be the first fully general solution to the level-of-detail problem, allowing an arbitrary number of arbitrarily complex objects to exist in a real-time virtual world.

Another advantage of the present invention is that any hugely detailed model can be supplied and can always have a successful optimisation. This has been a major problem in the prior art methods. Also no modelling restrictions apply: the present invention does not require adherence to a specified set of geometries and topologies unlike some of the prior art methods.

As a result of the present invention, an object's required time do be drawn tends to a zero as the desired complexity of that object (e.g. its projected area) tends to zero. In other words, as an object recedes to the horizon, its contribution to the draw time decreases to zero. Whilst this may appear to be a simplistic concept, it has proved to be too difficult to implement prior to the present invention.

Implementing the present invention leads to amortising the draw cost over many objects in the distance, which reduces the minimum draw time below the atom of a single polygon. Hence, in the limit, only memory constrains the number and complexity of objects populating the world.

The determining and using steps of the method are preferably arranged to be implemented in real time such that desired graphical representations making up a given frame can be selected and displayed within a frame period. A major benefit of the present invention is that it allows the appropriate proportions of the graphics system's time to be devoted to generating a scene in accordance to individual parts of a scene's relative visual importance.

Preferably, the using step comprises iteratively recursing the plurality of stored graphical representations in order of decreasing size and comparing the determined viewing distance to the object with the size of the representation containing at least part of the object to establish whether a further iteration is required. This advantageously enables the present invention to be applied to iterative implementations which are ideally suited for speeding up the method.

In an embodiment of the present invention, the using step comprises multiplying the size of the representation with a complexity factor prior to carrying out the comparing step, the complexity factor reflecting the available processing power for implementing the method. The present method accordingly takes the processing power of the graphics hardware being used to draw the representations into consideration in the retrieval of the appropriate level-of-detail representation.

The complexity factor can be varied from frame to frame by way of frame duration feedback in order to determine the correct complexity level for the given processing power of a system. Alternatively, the draw time of each representation may be predetermined and the recursing step may comprise carrying out a further iteration of the recursion if the remaining frame time is greater than the estimated draw time for displaying the representations to be considered in the next iteration. In this way, a top-down approach may be applied to the level of detail problem and situations where the available processing time does not permit the desired level-of-detail to be displayed can be accommodated.

The selecting step preferably comprises retrieving the desired representation from a database of object representations. Whilst a non-optimum implementation of the present invention could include a relational database, preferably the retrieving step comprises retrieving the desired representation from a hierarchical world database having a plurality of levels of nodes and containing relative positional information regarding the objects, each level of nodes representing a different level of detail for objects represented within the database. An example of a suitable database is an octree.

In order to advantageously assist in the subsequent traversal of the world database, preferably each node in a given level is a fixed multiple of the size of the node in an adjacent lower level.

In the presently preferred embodiment of the present invention, each node contains a representation (imposter) of the object information of all smaller dependant nodes at lower levels within the region of space of the node. Such imposter representations provide the different levels of detail of objects within the database. Preferably, the highest detail object representations are stored in a plurality of hierarchical object databases that are linked to the world database, the levels of each object and world databases being contiguous to provide an apparently seamless increase in the level of detail at incrementally deeper levels. In this way the traversal of the world database to deeper and deeper levels requiring greater and greater levels of detail, can be seamlessly continued on in an object database.

A root node of each object database may also be provided in the world database as a pointer from the world database to a respective object database. The provision of a root node enables the object to be related to other objects within the framework of the world database and to be used, in combination with the root nodes of other objects, for generating imposters throughout the world database. Also as the root node provides a drawable representation of the object, the object can be considered in many views without accessing the object's database.

The step of determining the viewing distance may comprise determining a view vector direction and calculating the magnitude parallel to the view vector direction of a vector representation of the distance between the object and the viewpoint. This provides an approximated distance for each object which makes viewing the objects in two-dimensional representation more realistic.

The method may further comprise determining a field of view from the viewpoint in the view vector direction. This enables filtering of information which is not immediately required for viewing a scene and is important in reducing the amount of data that needs to be processed in real time.

Preferably the method further comprises selecting representations lying fully or partially within the field of view for possible recursion. In this way, a realistic image of a scene can be generated.

The present invention also extends to a graphics system for generating a graphical image of at least part of an object provided within a hierarchically divided region of space from a plurality of stored graphical representations of the differently sized sub-regions of the space, the system comprising: calculating means for determining a viewing distance between the object and a viewpoint from which the object is being viewed; a plurality of stored graphical representations of differently sized sub-regions of the space; and processing means arranged to use the determined viewing distance to select, from the plurality of stored graphical representations, a graphical representation of a sub-region of the space in which at least part of the object resides, the size of the selected sub-region corresponding to the calculated viewing distance and determining the level of detail of the graphical image of at least part of the object to be generated and displayed.

According to another aspect of the present invention, there is provided a method of generating a graphical image of scene comprising a plurality of objects as viewed from a viewpoint, the method comprising: determining viewing distances between the viewpoint and each object; and using each of the determined viewing distances to select, from a plurality of hierarchically stored graphical representations of a region of space and differently sized sub-regions of the space, a graphical representation of a sub-region of the space for each object in which at least part of the object resides, wherein the size of each selected sub-region, associated with the calculated viewing distance for the corresponding object, determines the level of detail of the graphical image of the corresponding object which is to be generated, and the selection is effected independently such that different distances providing different levels of detail can be provided within the graphical image of the scene.

According to another aspect of the present invention there is provided a method of storing an graphical object comprising a plurality of polygons in a hierarchical tree structure database of a plurality of differently sized regions of space, the method comprising: determining the size of a root node of the database by measuring the size of a bounding box formed around the object and making the root node size equivalent; establishing a depth level for placement of each polygon by comparing each polygon's largest dimension with the sizes of the different regions of space and selecting the depth level of the closest sized region; and placing each polygon at its corresponding selected depth level as a leaf of the hierarchical tree structure database.

This method of storing graphical objects is advantageously optimised for information retrieval. This is because the relationship between each depth level in the database can be exploited for fast data retrieval.

The differently sized regions may be created on demand, the sizes of the possible different regions may be predetermined and the method may further comprise using the calculated depth level of a polygon to subdivide recursively the root node into the plurality of smaller regions until an appropriate leaf sized region is created. Generating depth levels on the fly advantageously speeds up loading and minimises data storage requirements by ensuring that empty nodes are not generated.

The differently sized regions of a given level of the database may be a fixed multiple of the size of the node in an adjacent lower level. This provides certainty in the relationship between the size of a node and its depth level.

In a preferred embodiment of the present invention, the fixed multiple is two and the establishing step comprises iteratively comparing the size of the largest dimension with the size of the current region and if the largest dimension it less than half of the region size, then moving to the next smaller size of region in the adjacent lower level.

Each polygon is preferably also placed within the database according to its position and orientation. This is a key factor for creating a virtual world where the relative positioning and orientation of objects is important.

The method preferably further comprises generating imposter representations at each of the plurality of differently sized regions of space which is not solely a leaf of the hierarchical tree structure database. These drawable imposter representations provide the different level of detail representations required within the database.

The present invention also extends to a method of creating a world database having a hierarchical tree structure representing a plurality of differently sized regions of space, the method comprising: predetermining a size of the world database; storing an graphical object comprising a plurality of polygons in a hierarchical tree structure object database according to the storing method described above; replicating the root node of the object database as a pointer to its object database within the world database; and placing the replicated root node at a position corresponding to the relative position of the object within the region of space bounded by the world database and in a region of space having a volume size equivalent to the relative size of the object.

The advantages of this method are that objects can be added and deleted from the world database with minimum effort by simply adding or deleting a pointer. Also it means that hugely complicated object databases can be constructed without the need for altering the specifications of the world database.

Preferably the placing step comprises establishing a depth level for placement of the root node by comparing the root node's size with the sizes of the different regions of space of the world database and selecting the depth level of the closest sized region. The advantages of this have been described previously in relation to the loading of object databases.

Also the method may further comprise generating imposter representations at each of the plurality of differently sized regions of space. This enables different level-of-detail representations advantageously to be generated of any part of the world or object databases.

According to another aspect of the present invention there is provided an apparatus for storing an graphical object comprising a plurality of polygons in a hierarchical tree structure database of a plurality of differently sized regions of space, the apparatus comprising: measurement means arranged to measure the size of a bounding box formed around the object for determining the size of a root node of the database, and to make the root node size equivalent; depth level determining means for establishing a depth level for placement of each polygon, the depth level means being arranged to compare each polygon's largest dimension with the sizes of the different regions of space and to select the depth level of the closest sized region; and means for placing each polygon at its corresponding selected depth level as a leaf of the hierarchical tree structure database.

As an alternative to automatic imposter generation, it is possible to use merge tree data structures which contain imposters that have been manually generated using intuitive logic. This provides a less than optimum automated procedure but does enable better imposter representations to be made available.

More specifically, according to another aspect of the present invention, there is provided a method of storing a graphical object comprising a plurality of polygons in an object database having a hierarchical tree structure and representing a plurality of differently sized regions of space, the method comprising: determining the size of a root node of the object database by measuring the size of a bounding box formed around the object and making the root node size equivalent; forming a merge database having a hierarchical tree structure by repeatedly combining together adjacent ones of the plurality of polygons; the resultant merge database having a plurality of root polygons representing the object in its lowest acceptable resolution; establishing a depth level for placement of each root polygon within the object database by comparing each root polygon's largest dimension with the sizes of the different regions of space of the object database and selecting the depth level of the closest sized region; and placing each root polygon at its corresponding selected depth level within the object database.

According to another aspect of the present invention there is provided a method of generating an approximation representation of a graphical image comprising a plurality of polygons for the purpose of imposter generation, the method comprising: creating a planar primitive for each polygon; forming a bounding structure around each pair of primitives, the dimensions of the bounding structure being arranged to indicate the degree of planar and positional conformity of the neighbouring primitives; and selecting and merging together the planar primitives of the bounding structures indicating the highest degree of positional and planar conformity to form merged primitives.

Previous methods of imposter generation have been complex, slow or low quality. In contrast, the above method provides a simplistic but fast way of reducing the complexity of a graphical image without detriment to the quality of the image. This is ideally suited for imposter generation in loading of hierarchical databases for example.

In an embodiment of the present invention, the selecting and merging step comprises ordering the bounding structures for all possible neighbouring pairs of primitives into a ranked list based on the dimensions of the bounding structures. Also the selecting and merging step comprises selecting a plurality of highest ranked bounding structures having the smallest dimensions which represent the best fitting primitives. This is a simple and quick way of determining the most suitable candidate primitives for merging.

Preferably, the storing step comprises storing the planar primitives in a first hierarchical tree structure database according to the size of the planar primitive and the location of the centre of the primitive. Also the storing step preferably comprises storing the planar primitives in a second hierarchical tree structure database according to the size of the planar primitive and the orientation of its plane. These two different databases, which are preferably octrees, enable the procedure of selecting the best merging candidates to be simplified and thereby speeded up. This is because it is not necessary of every possible combination to be checked, rather primitives related in either position or orientation are selected.

The method may further comprise, after the selection and merging step, updating the first and second hierarchical tree structures with the selected merged primitives. This sets up the pool of primitives method for another iteration such that the reduction in complexity procedure can be repeated again to provide further reductions in graphical representation complexity. Accordingly, the method may further comprise repeating the forming step, using planar and merged primitives, the selecting and merging step, and the updating step until the total number of merged and planar primitives is below a predetermined threshold. For imposter generation, it is very important to get the number of polygons down to a predetermined number. In this way each imposter can have a fixed draw time and decisions regarding what level-of-detail can be drawn in a given frame time can be made.

The method preferably further comprises projecting the texture of the polygons onto the planes of the merged and planar primitives and then converting the merged and planar primitives into a representative set of polygons. These polygons can then be drawn as a simplified version of the original polygons.

The bounding structure may comprise a cylindrical structure, such that the length of the cylinder can be used to indicate the conformity of the two primitives within the structure. This is an optimum type of bounding structure which provides a fast way of determining the relative conformity of the primitives.

The merged primitive preferably has an equivalent structure to that of the bounding structure and the planar primitive may have an equivalent structure to that of the bounding structure, with a cylindrical length of zero. In this way the planar and merged primitives which may have to be combined, have compatible structures which can be readily combined.

When merging two input triangles into a single triangle, for example, the number of vertices is reduced from six to three and so a good representation of the input triangles rarely results. Rather than working with the triangles directly, the reduction technique used in the embodiment described herein considers an abstract circular disc to be formed around each triangle wherein the triangle is described by means of a planar density function. The discs, which can be more representatively merged than triangles as they do not possess any vertices, are known as planar primitives and they provide a parametric description of the space occupied by each triangle.

The planar primitive comprises information describing the polygon it represents, the information including the polygon's centre, its plane normal and its area. This is a subset of the information contained in a merged primitive because the merged primitive preferably comprises information describing the planar or merged primitives it represents, the information including the merged primitives centre, its plane normal, its area, its thickness and its density. The merged primitive may also include information describing edge constraints and/or information regarding adjoining neighbouring merged or planar primitives.

This aspect of the present invention also extends to a system for generating an approximation representation of a graphical image comprising a plurality of polygons for the purpose of imposter generation, the system comprising: creating means for creating a planar primitive for each polygon; bounding structure forming means for forming a bounding structure around each pair of primitives, the dimensions of the bounding structure being arranged to indicate the degree of planar and positional conformity of the neighbouring primitives; and merging means arranged to select and merge together the planar primitives of the bounding structures indicating the highest degree of positional and planar conformity to form merged primitives.

According to another aspect of the present invention there is provided a method of storing a plurality of graphical objects, the method comprising: creating a hierarchical tree structure database for each graphical object, the size of a root node of each hierarchical tree structure database representing the size of the corresponding object; creating a hierarchical tree structure database for the world, the size of a root node of the world database representing a predetermined size of the world; populating the world database with object representations by providing a traversable link to each graphical object database for each object within the world, wherein each traversable link comprises a copy of the root node of its respective graphical object database which acts as a pointer and is stored at a position corresponding to the relative position of the object within the region of space bounded by the world database and in a region of space having a volume size equivalent to the relative size of the object.

As mentioned previously, the advantages of this method are that objects can be added and deleted from the world database with minimum effort by simply adding or deleting a pointer. Also it means that hugely complicated object databases can be constructed without the need for altering the specifications of the world database.

This aspect of the present invention also extends to a system of storing a plurality of graphical objects, the system comprising: a plurality of hierarchical tree structure databases each representing a graphical object, the size of a root node of each hierarchical tree structure database representing the size of the corresponding object; a hierarchical tree structure database representing the world, the size of a root node of the world database representing a predetermined size of the world; loading means for populating the world database with object representations by providing a traversable link to each graphical object database for each object within the world; wherein each traversable link comprises a copy of the root node of its respective graphical object database which acts as a pointer and is stored at a position corresponding to the relative position of the object within the region of space bounded by the world database and in a region of space having a volume size equivalent to the relative size of the object.

BRIEF DESCRIPTION OF THE DRAWINGS

Methods and apparatus according to preferred embodiments of the present invention for generating computer graphics will now be described by way of example, with reference to the accompanying drawings in which:

FIG. 5 is a quadtree representation of the world octree shown in FIG. 2;

FIG. 6 is a flow diagram showing the steps involved in recursing an octree to determine the graphical representation for an object, or group of objects, to be output to the graphics display shown in FIG. 2;

FIG. 8c is a representation of the door hinge of FIG. 8b in a reduced level of detail, as viewed from above;

FIG. 8d is a perspective view of the door hinge of FIG. 8b when reduced to its minimum level of detail which is acceptable;

FIG. 8e is a perspective view of the door of FIG. 8a when all of its features have been reduced to their minimum levels of acceptable detail;

DETAILED DESCRIPTION OF PREFERRED EMBODIMENTS OF THE PRESENT INVENTION

Figure 1:
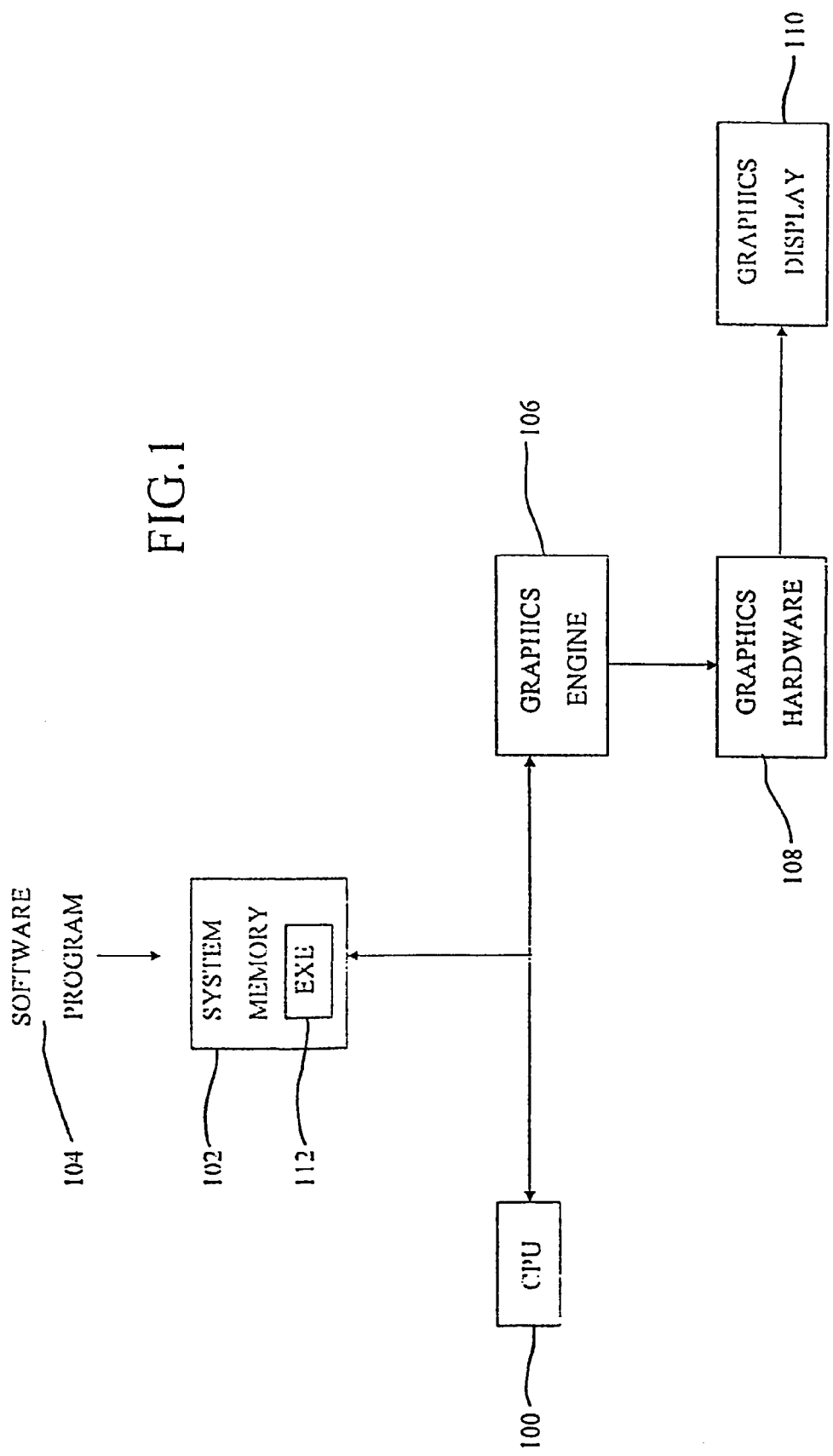
FIG. 1 is a schematic block diagram showing a prior art apparatus for generating computer graphics.
Figure 2:
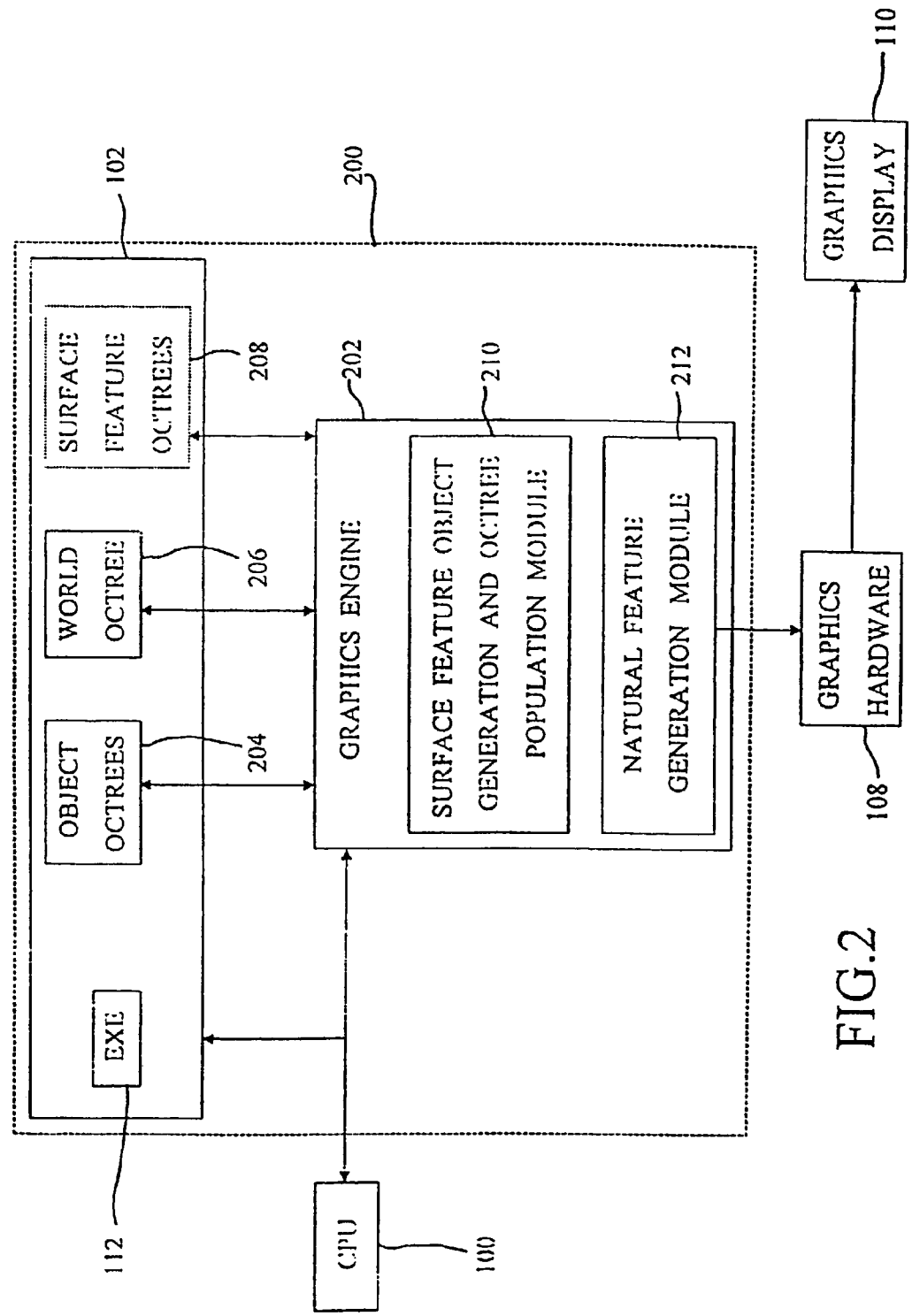
FIG. 2 is a schematic block diagram showing a graphics system for implementing a first embodiment of the present invention.

With reference to FIG. 2, a graphics system 200 according to a first preferred embodiment of the present invention is now described, together with its operation on a computer system. The computer system shown in FIG. 2 is used to display scenes from a virtual world for use in a computer game.

The graphics system 200 comprises a graphics engine 202 and three graphics databases 204, 206 and 208. The three databases reside in memory 102 along with a program executable 112. The databases 204, 206 and 208 employ hierarchical octree structures, as introduced earlier, to store objects which can populate the virtual world together with imposters (visual approximations) of those objects. The first database 204 contains an octree for every unique object that may appear in the virtual world and which can be output to a graphics display 110 of the computer system. The second database 206, or world octree, stores a root imposter for each object along with imposters approximating groups of the root imposters. A root imposter of an object is the visual approximation of least detail from the octree of the object. The third database 208 resides in a cache and contains octrees for objects representing physical surface features, such as cracks, which can be applied to other objects such as paving slabs. These objects are generated, along with their imposters, by the surface feature object generation and octree population module 210, as required. The results are typically stored in the cache for half an hour beyond the time they were last accessed before being deleted to free up more database space. The graphics engine 202 also possesses a module 212 for directly generating naturally occurring features such as clouds, which do not require imposter approximations and octree storage.

In drawing a frame from the virtual world, the graphics engine 202 need only display those objects which lie the field of view of an observer (or camera) in the virtual world. Upon receiving the location and direction of a viewpoint (or camera position) from the central processing unit 100, the graphics engine 202 establishes the field of view and what objects will be seen (including those which are only partially visible). The graphics engine 202 is also able to determine the level of detail to which each object can be displayed. The level of detail to be displayed for each object is primarily dependent upon the object's distance from the viewpoint, such that objects closer to the viewpoint are depicted in greater detail than those which are further away. The level of detail also depends to a lesser extent on the specification of the graphics hardware 108 and the graphics display 110.

In use, the graphics engine 202 retrieves the appropriately detailed imposter from databases 204, 206 or 208 for each object, or group of objects, that is within the field of view. If an object is sufficiently close to the view point the graphics engine 202 accesses the more detailed imposters from the object's octree stored in the first database 204, otherwise it retrieves those from the world octree 206. The graphics engine 202 similarly retrieves imposters of appropriate detail from the octrees 208 generated for surface features. It also generates naturally occurring features of repetitive detail as required. The graphics information selected by the search engine 202 is then passed to the graphics hardware system 108; this information ensures that the time devoted to processing each object is kept in proportion to its relative positional importance to the visual scene to be output to the graphics display 110. For example, buildings in the background (relatively far from the viewpoint), say near the horizon, may be depicted in the virtual world by single blocks of colour such that their windows, say, are not apparent, whereas a building in the foreground (relatively near the viewpoint) may be drawn with windows, window sills and frames and perhaps even cracks or moss on the sills and frames. The graphics hardware 108 is also responsible for texture mapping; this is usually handled by a specialised three-dimensional graphics card.

The computer system shown in FIG. 2 is provided with the software graphics engine 202, the populated object octrees in the first database 204 and the populated world octree 206 when the program executable 112 is loaded into the system memory 102. When it is run the program executable 112 functions to generate the computer game graphics. The processes involved in populating the octrees, including imposter generation, are described below with reference to FIGS. 3 and 4.

Each object is created by a graphics designer and comprises a complex structure typically made up of millions of polygons; in this embodiment each polygon is a triangle which is the simplest and quickest polygon to draw. The procedure for placing an object's constituent triangles within an octree is outlined below. Firstly, an octree's root node size is determined by taking the object, forming a three-dimensional bounding box around it and using the size of the bounding box as the size of the root node. Then the object's octree is populated with the triangles which form the object, the triangles being positioned in the octree according to their relative size, position and orientation. The length $L_t$ of the longest dimension of each triangle is determined in order to calculate the depth level n to which each triangle must be placed within the octree. More specifically, for each triangle having longest dimension $L_t$ the depth n is governed by the relation:

$$L_{n+1} < L_t \leq L_n$$

where:
$L_n$ is the side length of a cubic node in the octree at depth level n, with $L_0$ being the side length of the object's bounding box;

$L_{n+1} = L_n/2;$ $L_n = L_0 2^{-n};$ and $n = -\log_2(L_n/L_0).$

In the present embodiment, the root node or bounding box for each object is scaled to have unit length and so the correct depth to which each triangle must be placed within an object's octree can be determined directly by calculating $-\log_2 L_t$. Once the correct depth has been determined the triangle is placed in the node in which its centre lies. The deepest nodes containing these triangles, namely the nodes with the greatest detail, form the leaves of the hierarchical octree structure.

The generation of imposters for filling an object's octree from an object's constituent triangles is now described with reference to FIG. 3. Imposter generation takes place after the object's constituent triangles have been loaded at 300 into its octree, as described above. In the present embodiment an imposter is created within each parent node of the object's octree, using the information stored in its child nodes. The generation of imposters for an object, to be stored in the object's octree, therefore begins by using the leaves of the object's octree.

In the present embodiment, the maximum number of triangles permitted in any node within any octree is hardcoded within the imposter generation software program as a constant value—typically between 20 and 40 triangles. This range has been determined with respect to two competing factors. If the maximum number of triangles allowed in each node is restricted to too small a number, an excessively large number of imposters (nodes) will be generated. When processing an image to be displayed on screen, each node has a computation cost associated with it. The fewer triangles permitted per node, the more nodes there will exist to be processed increasing the computational cost and thereby unnecessarily detracting from the quality of the graphics produced. On the other hand if too many triangles are allowed in each node, too few imposters are generated with too coarse a resolution between them.

Therefore, when producing an imposter for a parent node the total number of triangles present in the parent node and in its child nodes is counted at step 302. The total number of counted triangles is compared to the predetermined maximum number allowed at 304. If the maximum number of triangles allowed is not exceeded, the imposter merely consists of the collection of triangles from the parent and its child nodes and is stored in the parent node at 306. However, if there are too many triangles to be held in a single node, namely the total number exceeds the maximum allowable, further processing is carried out. This involves the use, at 308, of triangle reduction techniques to produce the imposter. The resulting triangles, which are reduced in number, are then stored at 310 as the imposter in the parent node.

Figure 3:
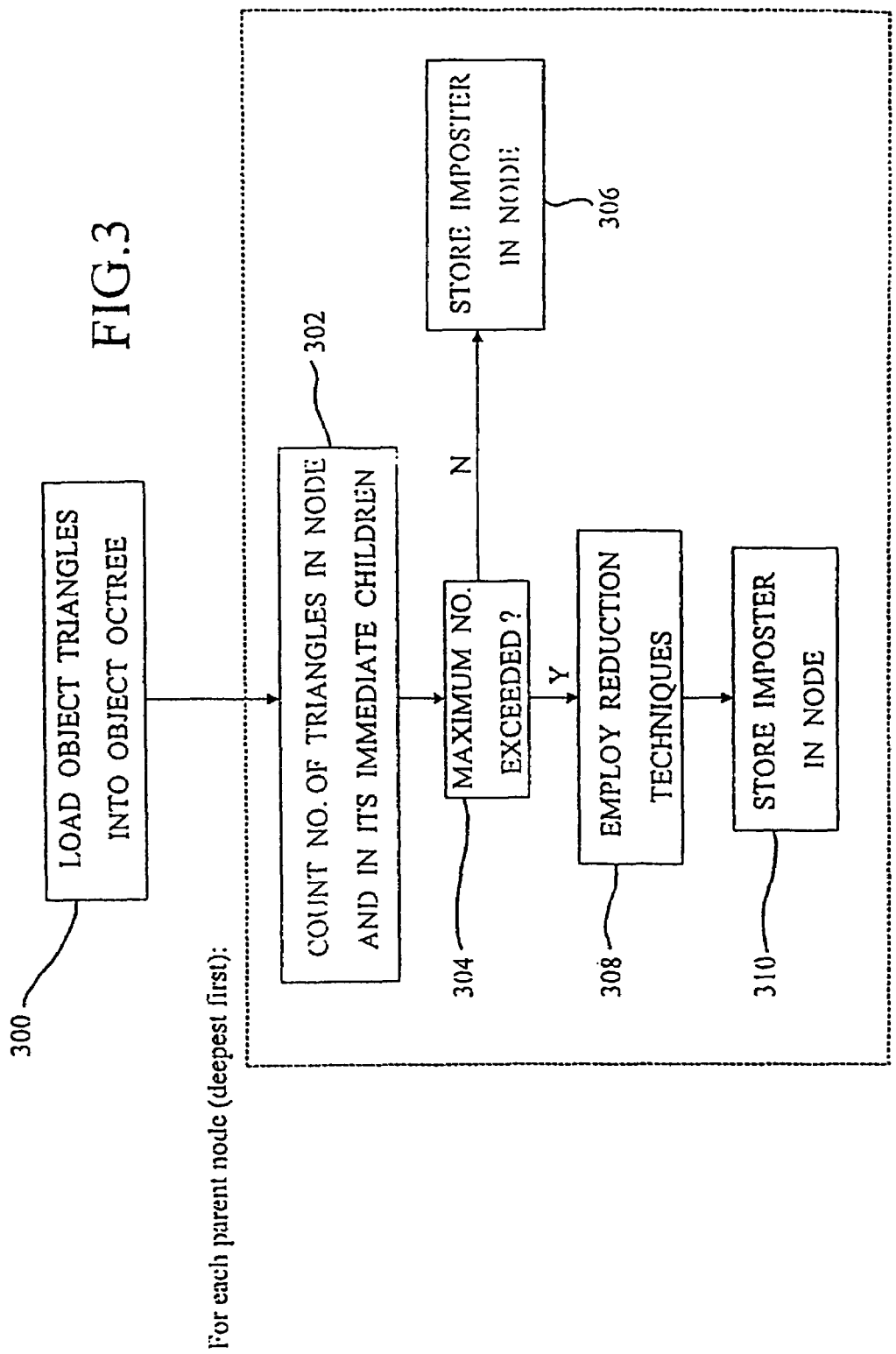
FIG. 3 is a flow diagram showing the steps involved in populating an octree database of FIG. 2.
Figure 4A:
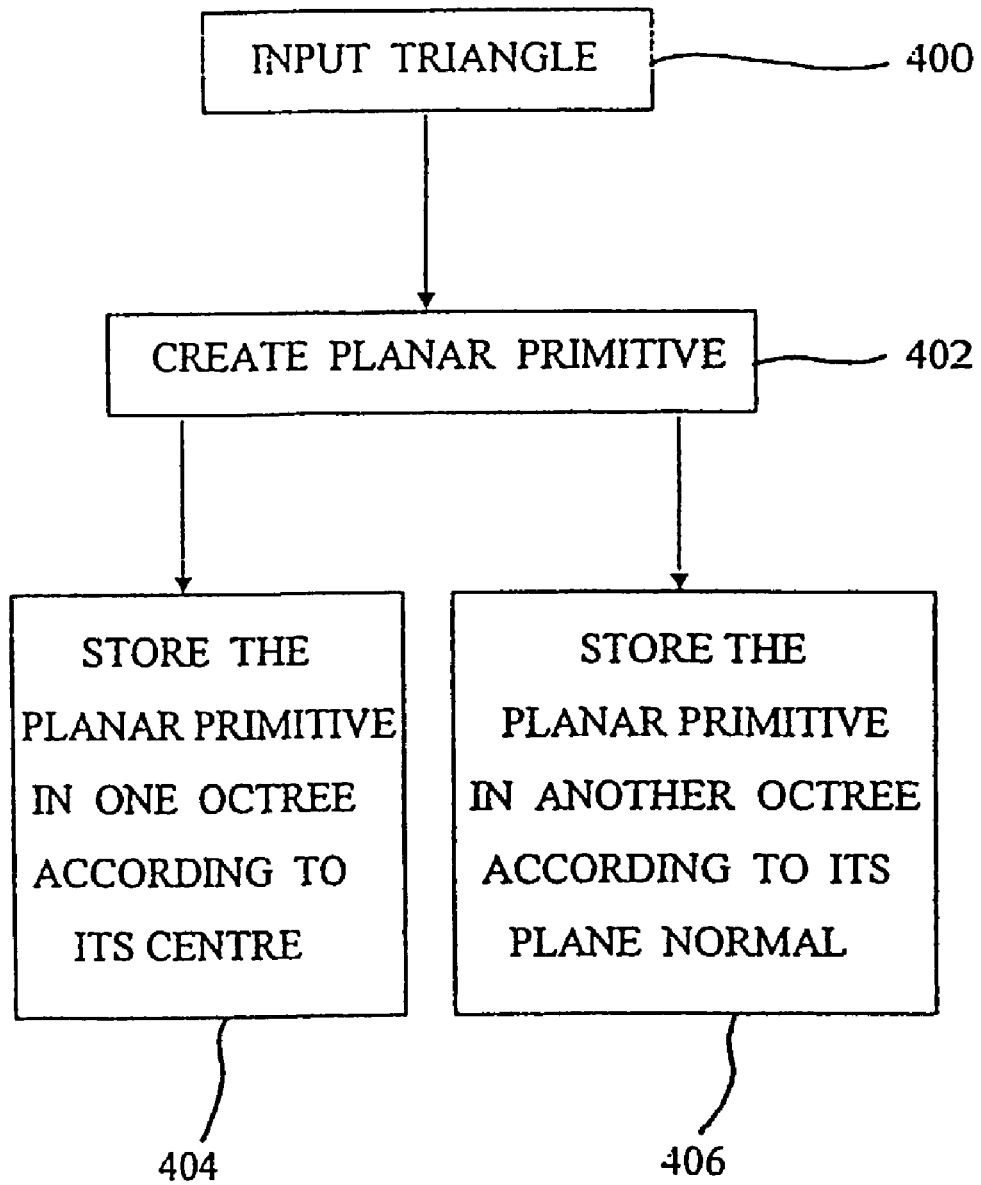
FIG. 4a is a flow diagram showing the steps involved in the first stage of the reduction technique step shown in FIG. 3, namely the creation and storage of a planar primitive for each triangle in a node where the maximum allowed number of triangles is exceeded.
Figure 4B:
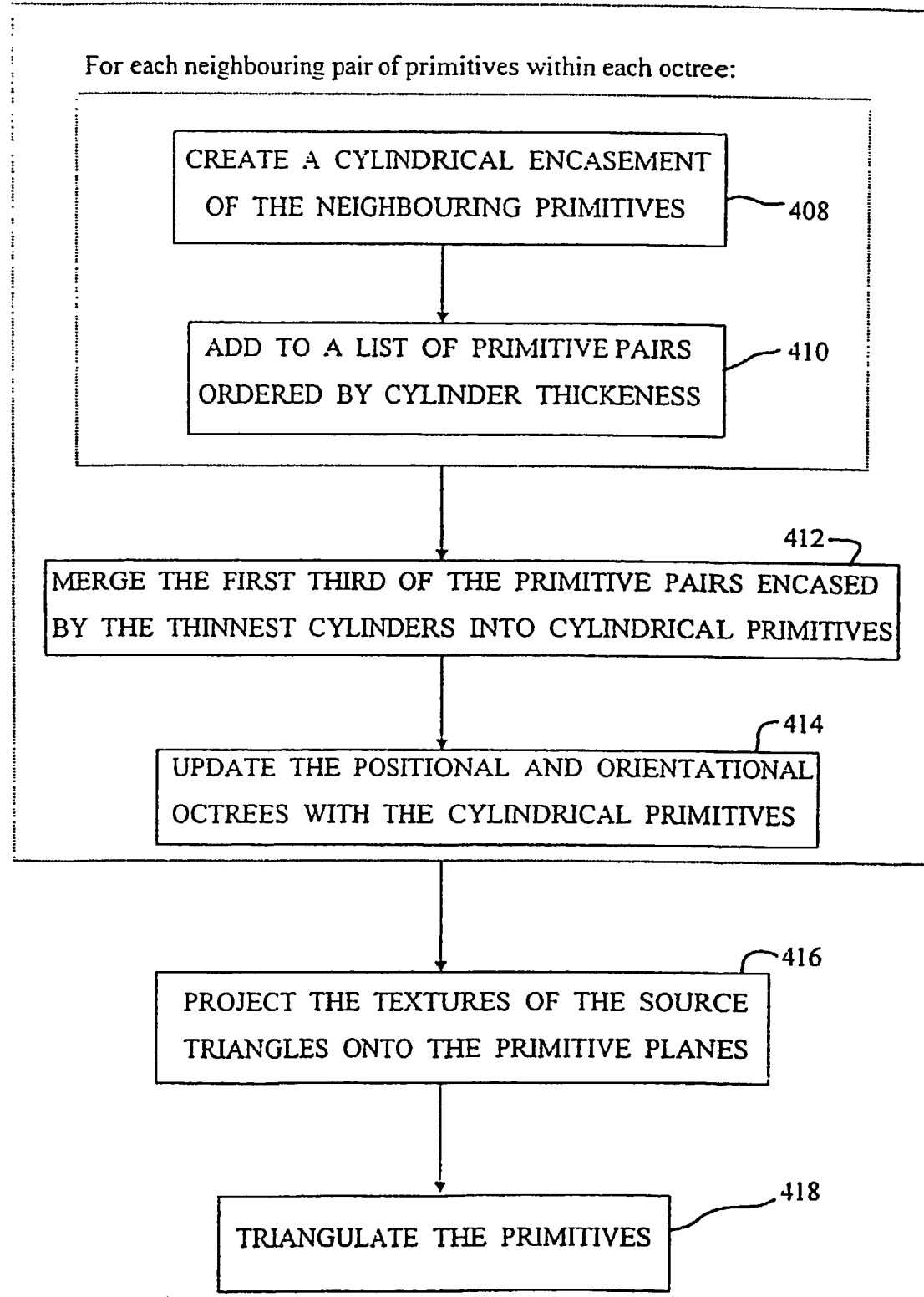
FIG. 4b is a flow diagram showing the steps involved in the second stage of the reduction technique step shown in FIG. 3, namely reducing the number of planar primitives for a node to an acceptable level.

A preferred technique of triangle reduction is now described with respect to FIGS. 4a and 4b, but it is to be appreciated that there are many existing reduction techniques which could also be employed at step 308 in FIG. 3 (see, for example, Krus et al. "Level of Detail and Polygonal Simplification" in the Crossroads series of electronic publications by the Association for Computing Machinery 1999). The technique employed here considers the triangles within the node for which the imposter is to be generated and identifies and merges those which are most closely matched, thereby reducing the number of triangles in the octree node. FIG. 4a summarises how the octree node triangles are manipulated prior to their being subject to the reduction process outlined in FIG. 4b.

More specifically, FIG. 4a shows that the manipulation process commences with each octree node triangle being loaded at step 400. Then a primitive is created at step 402 for each octree loaded triangle. Each primitive contains information describing its centre, normal, area, thickness, density and various edge constraints for combining adjacent primitives. The primitives can also store information regarding which neighbours are joined up. In this regard, when the triangles are first converted into primitives, these are called planar primitives because they contain no thickness, density, edge constraint or neighbour information.

The planar primitives which are most likely to be closely matched are those in near proximity to each other or those having similar orientations. Hence, rather than least-squares testing every possible pair of the planar primitives to determine their conformance and suitability for merging, two separate octrees are used to group the planar primitives according to their relative positions and orientations, respectively. This allows for quick identification of the planar primitives which are most suitable for merging.

At step 404 in FIG. 4a each planar primitive arising from an octree triangle loaded at step 400 is loaded into an octree according to the relative co-ordinates of its centre. Concurrently, at step 406 an identical planar primitive is loaded into a further octree according to the vector normal to its plane. Each normal vector is taken to have an origin at the centre of the octree and the planar primitive is loaded into the octree along this vector. In each case, at steps 404 and 406, the depth to which a planar primitive is loaded within each octree is determined by its size (as in the loading of triangles into the original octree described previously) but also such that the final-depth node is singly-occupied.

Once all of the triangles from the original octree node have been manipulated and stored as described in FIG. 4a, the reduction process outlined in FIG. 4b is performed. At step 408 each pair of neighbouring primitives in both the positional and orientational octrees populated in steps 404 and 406, respectively, are encased by a cylinder of the smallest dimensions possible. The thickness (length) of the cylinder gives a measure of the conformance of the two primitives contained within, the thinner (shorter) the cylinder the higher the conformance, and the primitive pairs are placed in order of encasing cylinder thickness at step 410. The first third of the primitive pairs in the thinnest cylinders are merged to form cylindrical (merged) primitives at step 412. The cylindrical primitives contain more information, such as thickness, density etc. (mentioned above) than the planar primitives. The corresponding neighbouring primitives in the positional and orientational octrees are then replaced by the new cylindrical primitives at step 414. The process described by steps 408, 410, 412 and 414 of encasing and merging neighbouring primitive pairs from the positional and orientational octrees is repeated until the number of primitives in each octree equals half the maximum number of triangles allowed in the original octree node.

The remaining primitives, which may comprise both planar and cylindrical primitives, will characterise the dominant planes in the image formed from the source triangles. The textures of the source triangles are projected at step 416 onto the planes to create texture maps for sampling. At step 418 the primitives are triangulated with reference to any inter-primitive welding constraints, the dominant plane lying through the centre of each cylindrical primitive giving rise to one or more triangles. The corresponding texture map is sampled for each resultant triangle, allowing a welded vertical to be constructed for each one. Returning to FIG. 3, the resulting triangles are stored at 310 as the imposter in the parent node.

A similar process of creating imposters is repeated throughout the octree for successively reduced depth levels, leading to the creation of an imposter at each parent node from the triangles contained in it and its child nodes (the child nodes containing the triangles of more detailed imposters). Eventually, the root node of the object's octree contains a single imposter representing the whole object.

The world octree 206, containing imposter representations of all of the objects in the virtual world, is constructed in a similar way to an object's octree. The size of the virtual world and the positions of the objects within it are predetermined by a graphics designer. The virtual world size determines the size of the root node of the world octree 206, whilst the positions of the objects determine the relative positions of each imposter representing an object within the world octree 206. In the same way that the constituent triangles of an object are loaded at 300 into its octree, as described previously, so constituent objects of the virtual world are effectively loaded into the world octree 206. The root imposter of each object is loaded into the world octree 206 according to the size of its associated object and its relative position within the virtual world, as decreed by the graphics designer. The effective loading of each object into the world octree 206 is achieved by means of a spawning technique in which a pointer to each object's octree is stored alongside its root imposter in the world octree 206. In a similar manner to the above described triangle depth calculation, the correct depth level in the world octree 206 for each object root imposter and pointer is quickly established by taking $-\log_2$ of its associated object size.

Following the loading of the world octree 206 with object root imposters, the rest of the world octree 206 is populated with world imposters. World imposters provide approximations of groups of objects, allowing many objects to be drawn quickly without having to do individual processing for each object. World imposters are created for each parent node within the world octree 206 in the same way that imposters are created for all nodes, at depth levels less than the leaves, in an object's octree. Thus, in the world octree 206 a world imposter represents an object in less detail than the object's root imposter, and can represent several different objects at once. Imposters held within an object's octree are accessible from the world octree 206 using the spawning technique, in which a pointer addresses the corresponding root node of the object's octree. Therefore the pointer facilitates the retrieval of more detailed imposters which enables an object to be described in increasing detail.

As mentioned previously, in presenting a scene from the virtual world using the computer system shown in FIG. 2, the graphics software engine 202 identifies the objects to be included in the scene by virtue of determining the field of view in the virtual world. Following this, the graphics engine 202 selects the appropriate imposter approximations representing the objects to be output to the graphics hardware 108. However, to meet a desired frame rate, such that the eye perceives continuity when viewing graphics display 110, the graphics software engine 202 is limited as to the number of nodes, and therefore imposters, that it can process. The number of nodes ($N_n$) that can be drawn per frame is essentially dependent upon the computer processing power, the frame rate and the maximum number of triangles allowed per node, the relationship being:

$$N_n = P/(F_r \times N_t)$$

where:

P is the processing power (number of triangles per second);

$F_r$ is the frame rate (Hz); and $N_t$ is the maximum number of triangles allowed per node.

Today, graphics performance can vary from 1 to 20 Million triangles/second with a typical 3D computer graphics card providing 9 Million triangles/second. With a frame rate of 30 Hz and 24 triangle/node, this means that approximately 10,000 nodes will be drawn per frame. As the power of the computer scales up, the average depth of recursion increases and more smaller nodes are drawn thereby increasing the quality of the image. Having said this, graphics of a reasonable quality can be produced with a minimum processing power specification of around 90,000 triangles per second for a target frame rate of 30 Hz. This produces around 1000 nodes drawn per frame.

More specifically, the graphics engine 202 selects an imposter from either the world octree 206 or an object octree contained in database 204, according to the importance of the object to the visual scene. The importance of an object to a visual scene is determined primarily by its position relative to the viewpoint, with objects closer to the viewpoint having a higher importance than objects which arc further away.

The amount of detail to be displayed, regarding each object in the field of view, is determined by comparing the normalised distance between the object and the viewpoint with the various different node sizes of the world octree 206. This procedure is now described with reference to an example illustrated by FIG. 5. FIG. 5 shows a quadtree representation 500 of the world octree 206. The different depth levels of the world octree 206 are represented by squares of different sizes 502, 504, 505. The world octree 206 contains an observer 'o' at a viewpoint 506 and two objects 'x' and 'y' whose positions are given by position vectors $p_x$ and $p_y$, respectively, with respect to observer 'o'. The position vectors $p_x$ and $p_y$ are vectors from the observer 'o' to the centre of the objects 'x' and 'y', respectively. A view vector V specifies the direction of view from the viewpoint 506. The field of view of the observer 'o' from viewpoint 506 is bounded by lines $f_1$ and $f_2$. The normalised distance between each of the objects 'x', 'y' and the viewpoint 506 is defined as being the component $L_x$, $L_y$ along the view vector v of each position vector $p_x$, $p_y$, respectively.

Once the normalised distances $L_x$, $L_y$ have been determined each is compared with a set of scaled node sizes which are fixed multiples of each other. In this embodiment each node size is half of the previous node size and represents a different depth level in the world octree 206, as shown in the lower part of FIG. 5. For the purposes of this example a scaling factor of 1 is assumed. Starting with the largest node size 508, the normalised distances $L_x$, $L_y$ are each recursively compared to progressively smaller node sizes 510, 512, 514 until the current node size is smaller than the normalised distance. Each successive cycle of this recursive comparison procedure indicates that the object can be displayed in greater detail using an imposter stored at a deeper level of the world octree 206. In the present example it is assumed that the objects 'x' and 'y' are both significantly smaller than the smallest node size 514 shown in FIG. 5, such that the pointers to the octrees of these objects will lie deeper within the world octree 206 than the corresponding smallest depth level that is shown, namely depth level 3. Taking a scaling factor of 1, object 'x' can be recursed down to a depth level of 2 whereas object 'y' can be recursed down to a depth level of 0.

It should be noted that a scaling factor of 1 has been applied in the above example, whilst in practice the node size is scaled by a complexity parameter. The complexity parameter (a scale factor in the equation that governs the decision on whether nodes of a certain size at a certain distance can be recursed further) changes the number of nodes that end up getting drawn in a frame. The complexity parameter is required because different computer systems will vary slightly in the time taken to draw the same number of nodes. The number of nodes being processed by the graphics software engine 202 for each system has to be adjusted accordingly. This is achieved by introducing the complexity parameter to scale the node length, thereby having a direct effect on the depth of recursion and the number of nodes selected. In addition to the above, different nodes will have different draw times according to their internal complexity. The complexity parameter is therefore not constant, it is fixed per frame and adjusted according to the draw frame time of the previous frame. For example, if the previous frame has exceeded the target frame time the complexity parameter of the frame to be processed will be reduced by way of feedback so as to reduce the number of nodes selected in the next frame. The feedback loop homes the complexity parameter towards a suitable value for the system.

Referring now to FIG. 6, a summary is shown of the processing performed by the graphics engine 202 for each object appearing in the field of view for presentation on the graphics display 110. The graphics engine 202 firstly considers at 600 whether it is possible to recurse the world octree 206. As mentioned previously, recursion is only possible if the scaled current node size is greater than the normalised object distance. If recursion is not possible then the imposter, or other data stored in the node, at the current depth level is drawn in step 602. If the condition for recursion is satisfied then the graphics engine 202 checks, at 604, whether the current node contains a pointer specifying the address of an object's octree stored in the first database 204. If the current node contains a pointer then the current node is made, at 606, the root node of the object octree as located at the memory address indicated by the pointer. Then the procedure commences again, at 600, from the root imposter node of the specific object's octree. If the current node does not contain a pointer, as determined by the check at 604, then the graphics engine 202 checks, at 608, whether another deeper depth level exists to recurse to within the world octree 206 or the object's octree. If no child nodes (deeper levels) exist then the leaf of the object's octree stored in the current node is again drawn at 602. If one or more child nodes exists, then each of these child nodes is processed in turn, as described below.

When the world octree 206 or object's octree is recursed, only those child nodes concerning the object which lie, or partially lie, within the field of view are considered. Accordingly, a check is made at 610 to determine the eligibility of each child node for display by the graphics hardware 108. If the child node is determined to be within the current field of view then the above process is repeated to check whether further recursion down the octree is possible and at what depth level each object should be drawn. If the current child node is not in the field of view, it is simply ignored and the next child node, if there is one, is obtained at 612, for field of view consideration at 610.

Eventually, each object required for the graphics display 110 is drawn at the appropriate level of detail using either an imposter from the world octree 206, an imposter from the object's own octree held in database 204, or using the constituent triangles of the object stored in the object's own octree.

Recursion of the octrees holding surface feature objects, held temporarily in a cache 208, is also possible in a manner similar to that described above. Naturally occurring features are drawn directly by the natural feature generation module 212 and are therefore not recursible.

Figure 7A:
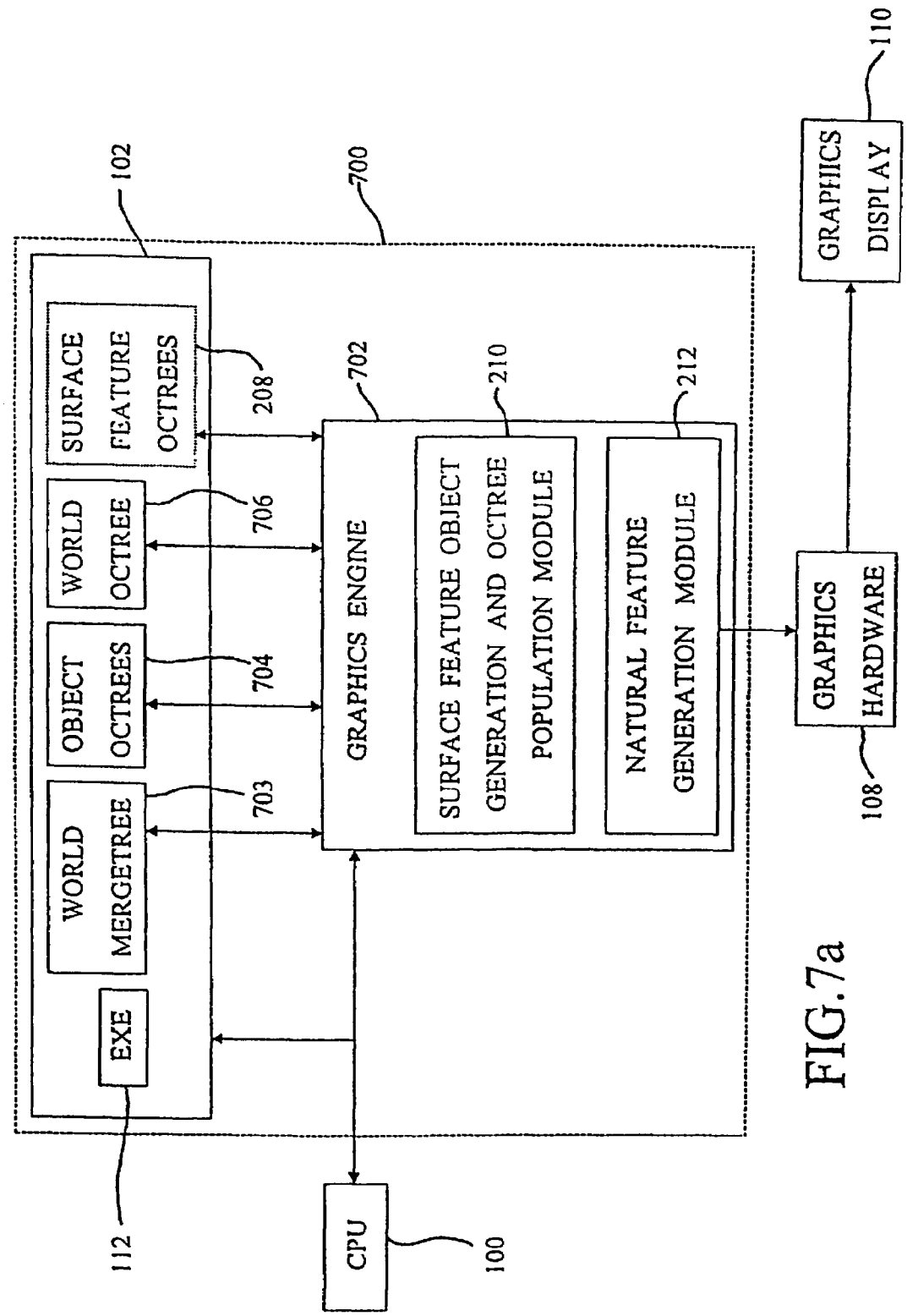
FIG. 7a is a schematic block diagram showing a graphics system for implementing a second embodiment of the present invention.

A second embodiment of the present invention will now be described with reference to FIG. 7a, which shows an alternative graphics system 700 for displaying scenes from a virtual world created by a computer game.

The graphics system 700 comprises a graphics engine 702 and four graphics databases 703, 704, 706 and 208. As with the graphics system 200 of the first embodiment, shown in FIG. 2, the databases reside in memory 102 along with the program executable 112. The surface feature octrees 208 are identical to those described in the first embodiment; they reside in a cache and are controlled by the surface feature object generation and octree population module 210 of the graphics engine 702. The databases for object octrees 704 and the world octree 706, which were also present in the first embodiment, serve slightly different purposes in the present embodiment. The fourth database, for a world mergetree 703, was not used in the first embodiment and is described below.

In the first embodiment the octree databases 204 and 206 were populated, at every parent nodal level, with imposter representations of objects or group of objects appearing in the virtual world of a computer game. In the present embodiment the majority of representations depicting the world's objects in different levels of detail are held in a so-called world mergetree 703 rather than in the octree databases 704 and 706. Rather than being populated throughout with imposter representations, the octree databases 704 and 706 are used primarily to maintain the relative spatial relationships between objects. They are therefore populated only with polygons representing either an object or a group of objects, respectively, in their lowest level of detail and are recursed to determine which of the world's objects can be seen at a particular viewing distance.

The level of detail in which those objects or groups of objects can be seen is determined by recursing the world mergetree database 703, which is accessible through, but exists outside of, the octree structures 704 and 706. The world mergetree 703 is created, in essence, by a graphics designer who progressively decides which polygons are suitable for merging to create less detailed representations suitable for when viewing takes place at larger distances. The world mergetree 703 captures all of the graphic designer's morphing decisions and provides a library of representations within which the detail of each object or group of objects has been reduced intuitively.

An explanation will now be given of how a mergetree for an object is formed and how it is incorporated into a world octree

706, followed by details of how a world mergetree 703 is created from the object mergetrees and also linked into the world octree 706.

As in the previous embodiment, the graphics designer begins by creating the objects which are to populate the virtual world of a computer game. The objects are depicted in their finest detail, each one being comprised of a multitude of polygons. The construction details of each of these polygons are stored at unique memory addresses within the computer. For example, the construction details of n polygons which make up an object A would be stored at address locations $A_1$, $A_2, \ldots, A_n$, respectively. The constituent polygons of an object created in its finest detail by a graphics designer are used to form the leaves of that object's mergetree.

In building an object's mergetree from its leaf polygons, the graphics designer considers which of the polygons could be morphed into a single polygon, with a view to creating a less detailed representation of the object. To facilitate this task, the graphics designer is provided with a graphics tool with which to select manually those polygons which are suitable for merging. The tool allows the graphics designer to move around the object and also to specify the corners that each new primitive should take. Following selection, the graphics tool calculates the construction details for a replacement parent polygon, based on the construction details of the input child polygons. In the case of object A, the construction details of the new parent polygons n+1, n+2, ..., n+m would be assigned memory addresses $A_{n+1}, A_{n+2}, \ldots A_{n+m}$, respectively. Pointers to the addresses of the respective child polygons are stored at each parent address.

The graphics designer continues to reduce the number of polygons which will be used to represent the object in this way until he or she considers that the object is represented in the lowest level of detail which is acceptable. Hence, a relationship such as that shown in FIG. 7b develops.

Figure 7B:
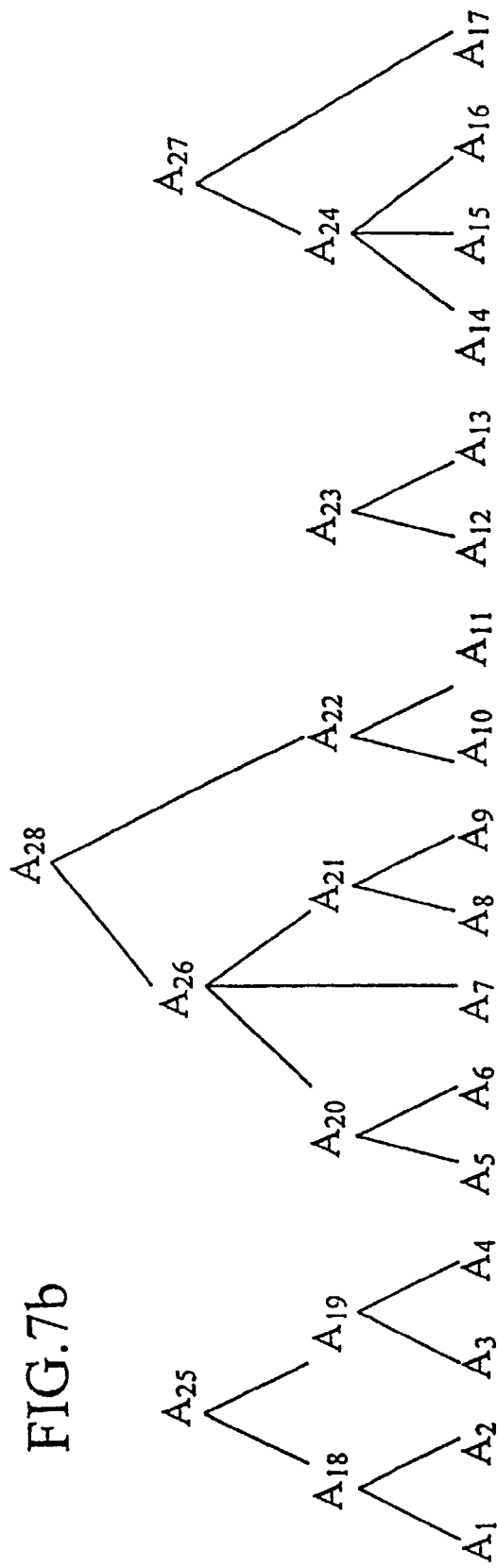
FIG. 7b is an example of a mergretree structure used in the second embodiment.

The hierarchy outlined in FIG. 7b is known as the object's mergetree and, unlike an object's octree, an object's mergetree can have more than one root which need not be at the same level. In the example shown in FIG. 7b, the roots of the mergetree are located at addresses $A_{25}, A_{28}, A_{23}$ and $A_{27}$ and these roots head subtrees of the object's mergetree. The object is represented in its lowest level of detail, as deemed acceptable by the graphics designer, when it is depicted by the polygons stored at the root addresses of its mergetree.

Figure 8A:
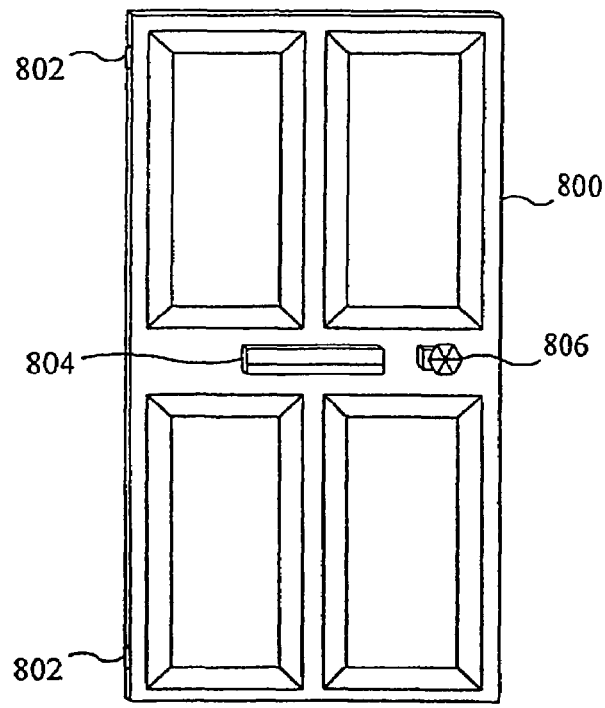
FIG. 8a is a perspective view of a door possessing various detailed features which is used to illustrate a processing example of the second embodiment.

In practice, an object often has several detailed features associated with it and the graphics designer will start by reducing the detail in these features down to a level that is comparable with the rest of the object before reducing detail in the object itself. For example, FIG. 8a shows a Victorian front door 800 which also features two hinges 802, a letterbox 804 and a door handle 806. The graphics designer would begin by first considering the two hinges 802 on the door, followed by the door handle 806 and the letter box 804, before moving on to reduce detail in the door itself. However, any surface features appearing on the door 800, such as cracks, would not be considered by the designer at this stage as they are generated in real time by the surface feature object generation and octree population module 210.

Figure 8B:
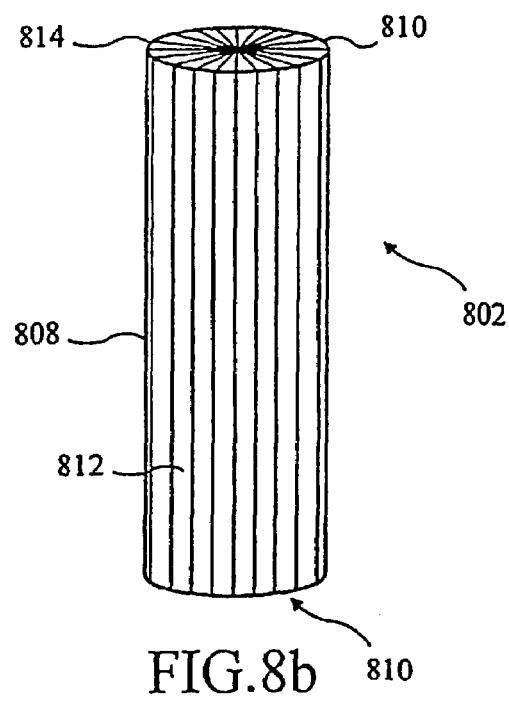
FIG. 8b is a perspective view of one of the door hinges of the door of FIG. 8a shown in its greatest level of detail.
Figure 9A:
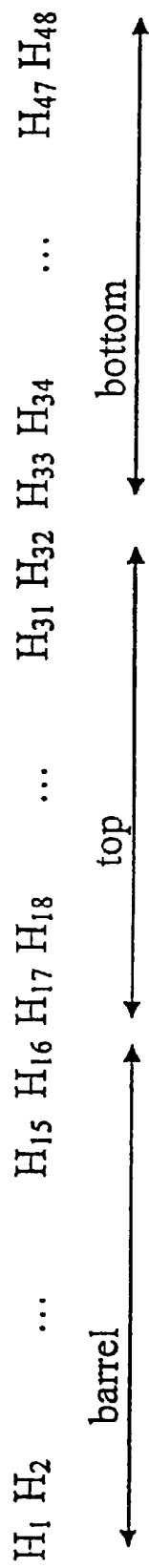
FIG. 9a is a mergetree structure for the hinge as it is depicted in FIG. 8b.

FIG. 8b shows one of the cylindrical door hinges 802 in full detail, with its barrel 808 being comprised of, say, sixteen quadrilaterals 812 and its top and bottom surfaces 810 each being comprised of, say, sixteen triangles 814 radiating from a centre of the end surface. In this example, the sixteen quadrilaterals 812 are stored at addresses $H_1$ to $H_{16}$ and the thirty-two triangles 814 are stored at addresses $H_{17}$ to $H_{48}$, giving rise to the structure shown in FIG. 9a.

Figure 9B:
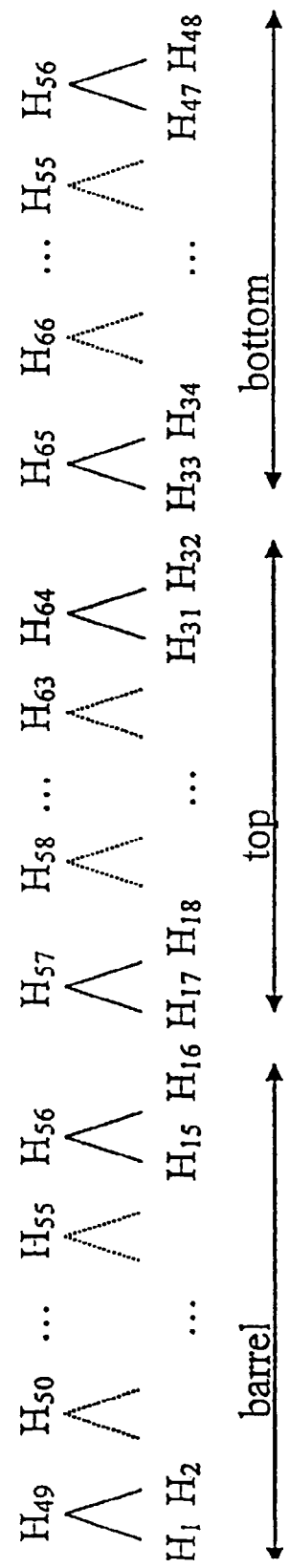
FIG. 9b is a mergetree structure for the hinge when it has undergone detail reduction to the level shown in FIG. 8c.

In the first stage of detail reduction, the graphics designer may merge neighbouring quadrilaterals 812 of the barrel 808 and neighbouring triangles 814 of the hinge's top and bottom surfaces 810 to leave eight larger quadrilaterals representing the barrel and eight larger triangles representing the top and bottom of the hinge, respectively. FIG. 8c shows the top surface of the hinge 802, viewed from above, after this reduction in detail has been carried out. The mergetree for the hinge 802 therefore develops as shown in FIG. 9b.

Figure 9C:
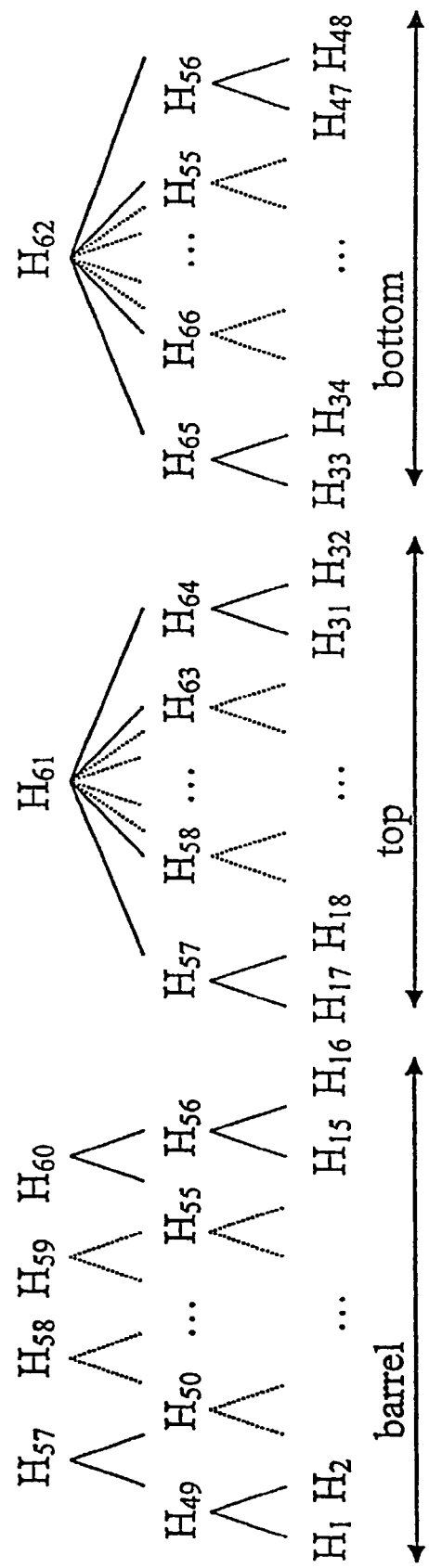
FIG. 9c is a mergetree structure for the hinge when it has been reduced to its lowest level of acceptable detail, as shown in FIG. 8d.

For the next level of detail, the graphics designer may merge the eight quadrilaterals down to four, and reduce each set of eight triangles down to a single quadrilateral. In this way the hinge 802 would be reduced, in its lowest level of detail, to a cuboid, as shown in FIG. 8d. After this final reduction of detail, the mergetree for the hinge 802 is complete and has the structure shown in FIG. 9c.

The construction details of the quadrilaterals which form the barrel 808 in its lowest level of detail are stored at memory addresses $H_{57}$, $H_{58}$, $H_{59}$ and $H_{60}$, respectively, whilst those which depict the top and bottom surfaces 810 in the least detail are located at $H_{61}$ and $H_{62}$, respectively.

In this way, detail in the two hinges 802, the letterbox 804 and the door handle 806 is reduced until a level comparable to that of the door 800 is reached, as shown in FIG. 8e. All of the mergetree roots from the mergetrees of the two hinges 802, the letterbox 804 and the door handle 806 are then incorporated along with the other 'leaf' polygons of the door 800. Pointers are used to connect from the door's mergetree leaves to the mergetrees for the door's more detailed features, as appropriate.

In practice, the graphics tool mentioned earlier facilitates the selection of whole areas of homogeneous tessellation, such that the resolution of these areas can be reduced en masse. Similarly, where an identical object such as a brick appears repeatedly, the tool can record the graphic designer's simplifications for one of the objects and then apply it to them all. The graphics tool, of course, also permits unravelling of a mergetree, so that if the rate of detail reduction is not as required it is possible to undo previous selections and rebuild the mergetree in a different way.

As in the previous embodiment, the representations of multiple objects are stored in relation to oneanother using the framework of a world octree 706. In order to link an object's mergetree to the world octree 706, its root polygons must first be collated into an octree for that object. This enables the spatial relationship between the mergetree roots, in the context of the object, to be maintained wherever the object is placed within the virtual world.

An object octree 704 is created and loaded in a similar manner to that described in the first embodiment. An octree for an object is established by forming a bounding box around the object as created by the graphics designer and this is recursively partitioned into smaller child nodes. The methodology for loading polygons into the object octree 704 also remains the same i.e. they are positioned according to their relative size, position and orientation within the object. Again, if the bounding box is scaled to have unit length, the correct depth to which each polygon should be loaded can be determined directly by calculating $-\log_2 L_p$, where $L_p$ is the length of the polygon's longest dimension. However, in this embodiment it is the root polygons from the object's mergetree which are loaded into the object octree 704, rather than the object's constituent 'leaf' polygons as described in the first embodiment. A pointer is stored alongside each mergetree root polygon in the object octree 704, linking it to its respective subtree of the object's mergetree.

An object primitive, comprised of the polygons stored in the root node of the object's octree 704, is then loaded into the world octree 706 for each of the world's objects (compare this with the loading of root imposters into the world octree in the first embodiment). Loading of the object primitives is performed according to object size and the relative position of the object within the virtual world. A pointer is then stored alongside each object primitive, linking it to its object octree 704.

At this stage, the graphics designer may be able to make further simplifications for groups of objects which will remain stationary in the virtual world. For example, the representation for a row of houses A, B, C, . . . , H could be progressively reduced from eight cuboids down to a single elongated cuboid if the viewing distance was sufficiently large. In this way the mergetrees of different objects can themselves be merged into a mergetree structure, the roots of which give rise to world primitives (representations showing groups of objects in their lowest level of acceptable detail for when the group is viewed on the world stage). World primitives are loaded into the world octree in the same way as object primitives and are linked back to their mergetree structures via pointers in the world octree 706.

Objects which are mobile within the virtual world are not considered for further detail reduction via amalgamation with other objects. This is because it is not feasible for the graphics designer to consider all of the possible permutations of objects that each mobile object may (or may not) come into contact with.

In the way that is outlined above, a mergetree for the world is established. The roots of the world mergetree 703 are given by the world primitives and the roots of those object mergetrees which are not suitable for further merging. The world mergetree 703 therefore also contains all of the object mergetrees.

The representations stored in the world mergetree 703 are accessible through the world octree 706. In order to present a scene from a virtual world, the graphics engine 202 described in the first embodiment establishes the field of view and what objects lie within it. The appropriate representation for each object is then selected by recursing through the world and object octrees. In the second embodiment, recursion from the world and object octrees continues down into the world and object mergetrees.

Recursion of the world and object octrees is carried out in the same manner as described in the first embodiment, namely by comparing the node size as scaled by a complexity parameter with the viewing distance to the object concerned. If a world primitive is encountered, representing a group of objects, then the graphics engine 702 transfers from the world octree 706 to the world mergeree 703 by means of a pointer. However, on return from the world mergetree 703, the graphics engine 702 will continue to recurse down the world octree 706 according to the usual recursion criteria, so that any other world primitives or object primitives, which are not part of the subtree of the world mergetree 703 which has been recursed, will also be found.

If an object primitive is located in the world octree 706, then the graphics engine 702 transfers from the world octree 706 to the object's octree 704 which is again traversed as in the first embodiment. If a root of the object's mergetree is encountered, the graphics engine 702 will transfer to the root of the appropriate subtree of the object's mergetree by means of a pointer. Again, on return from the subtree of the object's mergetree, the graphics engine 702 will continue to recurse down the object's octree 704 according to the usual recursion criteria, so that further roots of the object's mergetree which lie at deeper levels within the object's octree 704 will be located.

When the graphics engine transfers to any part of the world mergetree 703, the criteria for recursion is changed. Instead of traversing the nodes of an octree (with which a node size is associated), the nodes of a hierarchical memory tree are recursed. Each node in the world mergetree 703 has a polygon associated with it and the decision as to whether further recursion of the world mergetree 703 is possible is based on the size of the polygon at the node concerned.

Whereas in an octree it is the node size as scaled by a complexity parameter which is compared with the viewing distance, in a mergetree it is the polygon size as scaled by a complexity parameter which is compared with the viewing distance to that object. The subtrees of the world mergetree 703 are therefore recursed down to the nodes associated with the smallest polygon size appropriate for the viewing distance: the smaller the polygon size the greater the level of detail in the selected representation.

Having described particular preferred embodiments of the present invention, it is to be appreciated that the embodiments in question are exemplary only, and that variations and modifications, such as those which will occur to those possessed of the appropriate knowledge and skills, may be made without departure from the spirit and scope of the invention as set forth in the appended claims. For example, whilst the above described embodiments relate to computer game graphics generation, they could be used to provide graphics for use in any computer generated scene, such as those required in animation for flight simulators, virtual reality simulations and animated movies. Also rather than adjusting the complexity parameter on a frame by frame basis, the recursion of the system can be time based. Namely, a further iteration of the recursion can be carried out if the time remaining in the current time frame is greater than the estimated draw time for displaying the representations to be considered for the next iteration.

The invention claimed is:

1. A method of generating a graphical image of at least part of an object provided within a plurality of hierarchically divided regions of space from a plurality of stored graphical representations of the differently sized sub-regions of the space, the method comprising:
   determining a viewing distance between the object and a viewpoint from which the object is being viewed; and
   using the determined viewing distance to select, from the plurality of stored graphical representations included in one or more hierarchically divided regions, a graphical representation of a sub-region of the space in which at least part of the object resides, the size of the selected sub-region corresponding to the calculated viewing distance and determining the level of detail of the graphical image of at least part of the object to be generated.

2. A method according to claim 1, wherein the using step comprises selecting a graphical representation from a plurality of hierarchically stored graphical representations of the differently sized sub-regions of space, wherein objects provided within the sub-regions of space are independent of each other such that there is no logical hierarchy between the objects themselves.

3. A method according to claim 1, wherein the determining and using steps are arranged to be implemented in real time such that desired graphical representations making up a given frame can be selected and displayed within a frame period.

4. A method according to claim 1, wherein the using step comprises iteratively recursing the plurality of stored graphical representations in order of decreasing size and comparing the determined viewing distance to the object with the size of the representation containing at least part of the object to establish whether a further iteration is required.

5. A method according to claim 4, wherein the recursing step comprises carrying out a further iteration if the size of the representation under consideration is larger than the determined viewing distance.

6. A method according to claim 4, wherein the graphical image comprises a plurality of objects at different levels of detail and the recursing step comprises iteratively recursing the plurality of stored graphical representations for each of the plurality of objects until the desired level of detail for each object is reached as determined by consideration of the respective viewing distances of the plurality of objects and the size of the graphical representations.

7. A method according to claim 4, wherein the using step comprises multiplying the size of the representation with a complexity factor prior to carrying out the comparing step, the complexity factor reflecting the available processing power for implementing the method.

8. A method according to claim 7, wherein the complexity factor is varied between different frames in order to adjust the number of nodes drawn in each frame.

9. A method according to claim 4, wherein the draw time of each representation is predetermined and the recursing step comprises carrying out a further iteration of the recursion if the remaining frame time is greater than the estimated draw time for displaying the representations to be considered in the next iteration.

10. A method according to claim 1, wherein the using step comprises retrieving the desired representation from a database of object representations.

11. A method according to claim 10, wherein the retrieving step comprises retrieving the desired representation from a hierarchical world database having a plurality of levels of nodes and containing objects and independent relative positional information regarding the objects, each level of nodes representing a different level of detail for objects represented within the database.

12. A method according to claim 11, wherein each node in a given level is a fixed multiple of the size of the node in an adjacent lower level.

13. A method according to claim 11, wherein each node contains a representation of the object information of all smaller dependant nodes at lower levels within the region of space of the node.

14. A method according to claim 11, wherein the retrieving step comprises accessing the highest detail object representations stored in a plurality of hierarchical object databases that are linked to the world database, the levels of each object and world databases being contiguous to provide an apparently seamless increase in the level of detail at incrementally deeper levels.

15. A method according to claim 11, wherein the retrieving step comprises accessing the highest detail object representations stored in a plurality of hierarchical merge object databases that are linked to respective object databases, the levels of each object and world databases being contiguous to provide an apparently seamless increase in the level of detail at incrementally deeper levels.

16. A method according to claim 15, wherein the retrieving step comprises accessing at least one of the plurality of merge databases having a hierarchical tree structure of representations of its object, the merge database having a plurality of root polygons representing the object in its lowest acceptable resolution and each representation providing an optimised approximation of all more detailed representations dependent therefrom at lower levels.

17. A method according to claim 16, wherein the accessing step is carried out via the root polygons of the merge database which are stored in a corresponding hierarchical object database.

18. A method according to claim 15, wherein the retrieving step comprises accessing a hierarchical world merge database comprised of a plurality of representations of objects within the world database, the world merge database having a plurality of root polygons representing the objects in the world database in their lowest acceptable resolution and each representation providing an optimised approximation of all more detailed representations dependent therefrom at lower levels.

19. A method according to claim 11, wherein a root node of each object database is also provided in the world database as a pointer from the world database to a respective object database and the retrieving step comprises recursing down through the levels of the world database until a pointer is reached, spawning to a root node in an object database indicated by the pointer, and continuing the incremental recursion through the levels of the object database.

20. A method according to claim 1, wherein the step of determining the viewing distance comprises determining a view vector direction and calculating the magnitude parallel to the view vector direction of a vector representation of the distance between the object and the view-point.

21. A method according to claim 20, further comprising determining a field of view from the viewpoint in the view vector direction.

22. A method according to claim 21, further comprising selecting representations lying fully or partially within the field of view for possible recursion.

23. A method according to claim 1, further comprising accessing a database of octrees of surface features.

24. A method according to claim 23, further comprising caching surface features for a predetermined time period.

25. A method according to claim 1, further comprising generating naturally occurring repetitive features, such as clouds, which do not require different levels of detail for display.

26. A method according to claim 1, wherein the graphical representations comprise three-dimensional volumetric representations of space.

27. A computer readable medium storing instructions executable by a computer for causing a computer to implement a method according to claim 1.

28. A computer readable medium storing a computer game, the computer game comprising instructions for causing a computer to perform a method according to claim 1.

29. A graphics system for generating a graphical image of at least part of an object provided within a hierarchically divided region of space from a plurality of stored graphical representations of the differently sized sub-regions of the space, the system comprising:

calculating means for determining a viewing distance between the object and a viewpoint from which the object is being viewed;

storage means for storing a plurality of graphical representations of differently sized sub-regions of the space according to various criteria; and processing means arranged to use the determined viewing distance to select, from the plurality of stored graphical representations, a graphical representation of a sub-region of the space in which at least part of the object resides, the size of the selected sub-region corresponding to the calculated viewing distance and determining the level of detail of the graphical image of at least part of the object to be generated and displayed.

30. A method of generating a graphical image of a scene comprising a plurality of objects as viewed from a viewpoint, the method comprising:
    determining viewing distances between the view-point and each object; and
    using each of the determined viewing distances to select, from a plurality of hierarchically stored graphical representations of a region of space and differently sized sub-regions of the space in a plurality of databases, a graphical representation of a sub-region of the space for each object in which at least part of the object resides,
    wherein the size of each selected sub-region, associated with the calculated viewing distance for the corresponding object, determines the level of detail of the graphical image of the corresponding object which is to be generated, and the selection is effected independently such that different distances providing different levels of detail can be provided within the graphical image of the scene.

31. A computer readable medium storing instructions for causing a computer to implement a method according to claim 30.

32. A computer readable medium storing a computer game, the computer game comprising instructions for causing a computer to perform a method according to claim 30.

33. A method of storing a graphical object comprising a plurality of polygons in a hierarchical tree structure database of a plurality of differently sized regions of space, the method comprising:
    determining the size of a root node of the database by measuring the size of a bounding box formed around the object and making the root node size equivalent;
    establishing a depth level for placement of each polygon by comparing each polygon's largest dimension with the sizes of the different regions of space and selecting the depth level of the closest sized region; and
    placing each polygon at its corresponding selected depth level as a leaf of the hierarchical tree structure database.

34. A method according to claim 33, wherein the differently sized regions are created on demand, the sizes of the possible different regions are predetermined and the method further comprises using the calculated depth level of a polygon to subdivide recursively the root node into the plurality of smaller regions until an appropriate leaf sized region is created.

35. A method according to claim 33, wherein the differently sized regions of a given level of the database are a fixed multiple of the size of the node in an adjacent lower level.

36. A method according to claim 35, wherein the fixed multiple is two and the establishing step comprises iteratively comparing the size of the largest dimension with the size of the current region and if the largest dimension it less than half of the region size, then moving to the next smaller size of region in the adjacent lower level.

37. A method according to claim 33, wherein the placing step comprises placing at least some of the polygon in the region that contains its centre.

38. A method according to claim 33, wherein each polygon is a triangle.

39. A method according to claim 33, wherein the placing step comprises placing each polygon within the database according to its position and orientation.

40. A method according to claim 33, wherein the establishing step is carried out according to the following formulas:

$$n=-\log 2(Ln/L0)$$

$$Ln+1 < Lt \leq Ln$$

where:
n is the depth level;
Ln is the side length of a cubic node in a hierarchical tree structure database at a depth level n, with L0 being the side length of the object's bounding box;

$$Ln+1=Ln/2;$$

Lt is the length of the largest dimension of a polygon.

41. A method according to claim 33, further comprising generating imposter representations at each of the plurality of differently sized regions of space which is not solely a leaf of the hierarchical tree structure database.

42. A method according to claim 41, wherein the step of generating the imposter representations is carried out from the lowest depth levels of the database towards the highest root node level.

43. A method according to claim 42, wherein the generating step comprises approximating all smaller dependant leaves and imposters at lower levels bounded by the current region of space.

44. A method according to claim 42, wherein the generating step comprises counting all of the polygons of the smaller dependent regions together with the polygons present in the current region.

45. A method according to claim 44, wherein the generating step comprises comparing the total number of counted polygons for the current region to a predetermined fixed amount and if the total number exceeds the fixed amount reducing the number of polygons using an approximating technique.

46. A method according to claim 45, wherein the approximating technique involves merging polygons together having similar planar characteristics.

47. A method according to claim 45, wherein the predetermined fixed amount is determined by the available processing power for implementing the method.

48. A method of creating a world database having a hierarchical tree structure representing a plurality of differently sized regions of space, the method comprising:
    predetermining a size of the world database;
    storing a graphical object comprising a plurality of polygons in the hierarchical tree structure object database according to claim 33;
    replicating the root node of the object database as a pointer to its object database within the world database; and
    placing the replicated root node at a position corresponding to the relative position of the object within the region of space bounded by the world database and in a region of space having a volume size equivalent to the relative size of the object.

49. A method according to claim 48, wherein the placing step comprises establishing a depth level for placement of the root node by comparing the root node's size with the sizes of the different regions of space of the world database and selecting the depth level of the closest sized region.

50. A method according to claim 49, further comprising generating imposter representations at each of the plurality of differently sized regions of space of the world database.

51. A method according to claim 48, further comprising generating imposter representations at each of the plurality of differently sized regions of space of the world database.

52. An apparatus for storing a graphical object comprising a plurality of polygons in a hierarchical tree structure database of a plurality of differently sized regions of space, the apparatus comprising:
- measurement means arranged to measure the size of a bounding box formed around the object for determining the size of a root node of the database, and to make the root node size equivalent;
- depth level determining means for establishing a depth level for placement of each polygon, the depth level means being arranged to compare each polygon's largest dimension with the sizes of the different regions of space and to select the depth level of the closest sized region; and
- means for placing each polygon at its corresponding selected depth level as a leaf of the hierarchical tree structure database.

53. A method of storing a graphical object comprising a plurality of polygons in an object database having a hierarchical tree structure and representing a plurality of differently sized regions of space, the method comprising:
- determining the size of a root node of the object database by measuring the size of a bounding box formed around the object and making the root node size equivalent;
- forming a merge database having a hierarchical tree structure by repeatedly combining together adjacent ones of the plurality of polygons; the resultant merge database having a plurality of root polygons representing the object in its lowest acceptable resolution;
- establishing a depth level for placement of each root polygon within the object database by comparing each root polygon's largest dimension with the sizes of the different regions of space of the object database and selecting the depth level of the closest sized region; and
- placing each root polygon at its corresponding selected depth level within the object database.

54. A method according to claim 53, wherein the placing step comprises placing at least part of the root polygon in the region of the object database that contains its centre.

55. A method according to claim 53, wherein each polygon is a triangle.

56. A method according to claim 53, wherein the placing step comprises placing each polygon within the object database according to its position and orientation.

57. A method of creating a world database having a hierarchical tree structure representing a plurality of differently sized regions of space, the method comprising:
- predetermining a size of the world database;
- storing a graphical object in the corresponding object database according to claim 53;
- replicating the root node of the object database as a pointer to its object database within the world database; and
- placing the replicated root node at a position corresponding to the relative position of the object within the region of space bounded by the world database and in a region of space having a volume size equivalent to the relative size of the object.

58. A method according to claim 57, wherein the placing step comprises establishing a depth level for placement of the root node by comparing the root node's size with the sizes of the different regions of space of the world database and selecting the depth level of the closest sized region.

59. A method according to claim 57, wherein the storing, replicating and placing steps are repeated for one or more further objects and the method further comprises:
- forming a world merge database having a hierarchical tree structure by repeatedly combining together adjacent root nodes of a plurality of object databases, the resultant world merge database having a plurality of world root polygons representing merged objects in their lowest acceptable resolution;
- establishing a depth level for placement of each world root polygon within the world database by comparing each root polygon's largest dimension with the sizes of the different regions of space of the world database and selecting the depth level of the closest sized region; and
- placing each world root polygon at its corresponding selected depth level within the world database.

60. A computer readable medium storing instructions for causing a computer to implement a method according to claim 53.

61. A computer readable medium storing a computer game, the computer game comprising instructions for causing a computer to perform a method according to claim 53.

62. A method of generating an approximation representation of a graphical image comprising a plurality of polygons for the purpose of imposter generation, the method comprising:
- creating a planar primitive for each polygon;
- forming a bounding structure around each pair of primitives, the dimensions of the bounding structure being arranged to indicate the degree of planar and positional conformity of the neighbouring primitives; and
- selecting and merging together the planar primitives of the bounding structures indicating the highest degree of positional and planar conformity to form merged primitives.

63. A method according to claim 62, wherein the selecting and merging step comprises ordering the bounding structures for all possible neighbouring pairs of primitives into a ranked list based on the dimensions of the bounding structures.

64. A method according to claim 63, wherein the selecting and merging step comprises selecting a plurality of highest ranked bounding structures having the smallest dimensions which represent the best fitting primitives.

65. A method according to claim 62, further comprising storing the planar primitives in a store.

66. A method according to claim 65, wherein the storing step comprises storing the planar primitives in a first hierarchical tree structure database according to the size of the planar primitive and the location of the centre of the primitive.

67. A method according to claim 66, wherein the storing step comprises storing the planar primitives in a second hierarchical tree structure database according to the size of the planar primitive and the orientation of its plane.

68. A method according to claim 67, further comprising, after the selection and merging step, updating the first and second hierarchical tree structures databases with the selected merged primitives.

69. A method according to claim 68, further comprising repeating the forming step, using planar and merged primitives, the selecting and merging step, and the updating step until the total number of merged and planar primitives is below a predetermined threshold.

70. A method according to claim 69, further comprising projecting the texture of the polygons onto the planes of the merged and planar primitives.

71. A method according to claim 70, further comprising converting the merged and planar primitives into a representative set of polygons.

72. A method according to claim 67, wherein the hierarchical tree structure databases comprise octrees.

73. A method according to claim 62, wherein the bounding structure comprises a cylindrical structure, and the length of the cylinder is used to indicate the conformity of the two primitives within the structure.

74. A method according to claim 73, wherein the merged primitive has an equivalent structure to that of the bounding structure.

75. A method according to claim 73, wherein the planar primitive has an equivalent structure to that of the bounding structure, with a cylindrical length approximating zero.

76. A method according to claim 62, wherein the planar primitive comprises information describing the polygon it represents, the information including the polygon's centre, its plane normal and its area.

77. A method according to claim 62, wherein the merged primitive comprises information describing the planar or merged primitives it represents, the information including the merged primitive's centre, its plane normal, its area, its thickness and its density.

78. A method according to claim 77, wherein the merged primitive also includes information describing edge constraints and/or information regarding adjoining neighbouring merged or planar primitives.

79. A system for generating an approximation representation of a graphical image comprising a plurality of polygons for the purpose of imposter generation, the system comprising:
creating means for creating a planar primitive for each polygon;
bounding structure forming means for forming a bounding structure around each pair of primitives, the dimensions of the bounding structure being arranged to indicate the degree of planar and positional conformity of the neighbouring primitives; and
merging means arranged to select and merge together the planar primitives of the bounding structures indicating the highest degree of positional and planar conformity to form merged primitives.

80. A method of storing a plurality of graphical objects, the method comprising:
creating a hierarchical tree structure database for each graphical object, the size of a root node of each hierarchical tree structure database representing the size of the corresponding object;
creating a hierarchical tree structure database for the world, the size of a root node of the world database representing a predetermined size of the world;
populating the world database with object representations by providing a traversable link to each graphical object database for each object within the world,
wherein each traversable link comprises a copy of the root node of its respective graphical object database which acts as a pointer and is stored at a position corresponding to the relative position of the object within the region of space bounded by the world database and in a region of space having a volume size equivalent to the relative size of the object.

81. A computer readable medium storing instructions for causing a computer to implement a method according to claim 80.

82. A computer readable medium storing a computer game, the computer game comprising instructions for causing a computer to perform a method according to claim 80.

83. A system of storing a plurality of graphical objects, the system comprising:
a plurality of hierarchical tree structure object databases each representing a graphical object, the size of a root node of each object database representing the size of the corresponding object;
a hierarchical tree structure world database representing the world, the size of a root node of the world database representing a predetermined size of the world; and
loading means for populating the world database with object representations by providing a traversable link to each graphical object database for each object within the world;
wherein each traversable link comprises a copy of the root node of its respective graphical object database which acts as a pointer and is stored at a position corresponding to the relative position of the object within the region of space bounded by the world database and in a region of space having a volume size equivalent to the relative size of the object.

84. A method of generating a graphical image of at least part of an object provided within a hierarchically divided region of space from a plurality of stored graphical representations of the differently sized sub-regions of the space, the method comprising:
determining a viewing distance between the object and a viewpoint from which the object is being viewed; and
using the determined viewing distance to select, from the plurality of stored graphical representations, a graphical representation of a sub-region of the space in which at least part of the object resides, the size of the selected sub-region corresponding to the calculated viewing distance and determining the level of detail of the graphical image of at least part of the object to be generated;
wherein:
the using step comprises:
iteratively recursing the plurality of stored graphical representations in order of decreasing size and comparing the determined viewing distance to the object with the size of the representation containing at least part of the object to establish whether a further iteration is required; and
multiplying the size of the representation with a complexity factor prior to carrying out the comparing step, the complexity factor reflecting the available processing power for implementing the method; and
the graphical image comprises a plurality of objects at different levels of detail and the recursing step comprises iteratively recursing the plurality of stored graphical representations for each of the plurality of objects until the desired level of detail for each object is reached as determined by consideration of the respective viewing distances of the plurality of objects and the size of the graphical representations.

85. A method of generating a graphical image of at least part of an object provided within a hierarchically divided region of space from a plurality of stored graphical representations of the differently sized sub-regions of the space, the method comprising:
determining a viewing distance between the object and a viewpoint from which the object is being viewed; and
using the determined viewing distance to select, from the plurality of stored graphical representations, a graphical representation of a sub-region of the space in which at least part of the object resides, the size of the selected sub-region corresponding to the calculated viewing distance and determining the level of detail of the graphical image of at least part of the object to be generated;
wherein:
the using step comprises retrieving the desired representation from a database of object representations;
the retrieving step comprises retrieving the desired representation from a hierarchical world database having a plurality of levels of nodes and containing objects and independent relative positional information regarding the objects, each level of nodes representing a different level of detail for objects represented within the database; and a root node of each object database is also provided in the world database as a pointer from the world database to a respective object database and the retrieving step further comprises recursing down through the levels of the world database until a pointer is reached, spawning to a root node in an object database indicated by the pointer, and continuing the incremental recursion through the levels of the object database.

86. A graphics system for generating a graphical image of at least part of an object provided within a hierarchically divided region of space from a plurality of stored graphical representations of the differently sized sub-regions of the space, the system comprising:

a graphics engine for determining a viewing distance between the object and a viewpoint from which the object is being viewed; and a plurality of databases including various stored graphical representations of differently sized sub-regions of the space;

wherein the graphics engine is arranged to use the determined viewing distance to select, from the various stored graphical representations, a graphical representation of a sub-region of the space in which at least part of the object resides, the size of the selected sub-region corresponding to the calculated viewing distance and determining the level of detail of the graphical image of at least part of the object to be generated and displayed.

87. A method of creating a world database having a hierarchical tree structure representing a plurality of differently sized regions of space, the method comprising:

predetermining a size of the world database;

storing a graphical object comprising a plurality of polygons in a hierarchical tree structure object database by:

determining the size of a root node of the database by measuring the size of a bounding box formed around the object and making the root node size equivalent;

establishing a depth level for placement of each polygon by comparing each polygon's largest dimension with the sizes of the different regions of space and selecting the depth level of the closest sized region;

placing each polygon at its corresponding selected depth level as a leaf of the hierarchical tree structure database; and generating imposter representations at each of the plurality of differently sized regions of space of the object database which is not solely a leaf of the hierarchical tree structure object database;

replicating the root node of the object database as a pointer to its object database within the world database; and placing the replicated root node at a position corresponding to the relative position of the object within the region of space bounded by the world database and in a region of space having a volume size equivalent to the relative size of the object.

88. A method according to claim 87, wherein the placing step comprises establishing a depth level for placement of the root node by comparing the root node's size with the sizes of the different regions of space of the world database and selecting the depth level of the closest sized region.

89. A method according to claim 88, further comprising generating imposter representations at each of the plurality of differently sized regions of space of the world database.

90. A method according to claim 87, further comprising generating imposter representations at each of the plurality of differently sized regions of space of the world database.

91. An apparatus for storing a graphical object comprising a plurality of polygons in a hierarchical tree structure database of a plurality of differently sized regions of space, the apparatus comprising a graphics engine, wherein the graphics engine is arranged to:

measure the size of a bounding box formed around the object for determining the size of a root node of the database, and to make the root node size equivalent;

establish a depth level for placement of each polygon, to compare each polygon's largest dimension with the sizes of the different regions of space and to select the depth level of the closest sized region; and place each polygon at its corresponding selected depth level as a leaf of the hierarchical tree structure database.

92. A method of generating an approximation representation of a graphical image comprising a plurality of polygons for the purpose of imposter generation, the method comprising:

creating a planar primitive for each polygon;

storing the planar primitives in a store;

forming a bounding structure around each pair of primitives, the dimensions of the bounding structure being arranged to indicate the degree of planar and positional conformity of the neighbouring primitives;

selecting and merging together the planar primitives of the bounding structures indicating the highest degree of positional and planar conformity to form merged primitives; and updating the store with the selected merged primitives after the selection and merging step.

93. A system for generating an approximation representation of a graphical image comprising a plurality of polygons for the purpose of imposter generation, the system comprising a graphics engine, wherein the graphics engine is arranged to:

create a planar primitive for each polygon;

form a bounding structure around each pair of primitives, the dimensions of the bounding structure being arranged to indicate the degree of planar and positional conformity of the neighbouring primitives; and select and merge together the planar primitives of the bounding structures indicating the highest degree of positional and planar conformity to form merged primitives.

94. A system of storing a plurality of graphical objects, the system comprising:

a plurality of hierarchical tree structure object databases each representing a graphical object, the size of a root node of each object database representing the size of the corresponding object;

a hierarchical tree structure world database representing the world, the size of a root node of the world database representing a predetermined size of the world; and a graphics engine for populating the world database with object representations by providing a traversable link to each graphical object database for each object within the world;

wherein each traversable link comprises a copy of the root node of its respective graphical object database which acts as a pointer and is stored at a position corresponding to the relative position of the object within the region of space bounded by the world database and in a region of space having a volume size equivalent to the relative size of the object.

* * * * *

UNITED STATES PATENT AND TRADEMARK OFFICE
CERTIFICATE OF CORRECTION

PATENT NO. : 7,439,970 B1  Page 1 of 1
APPLICATION NO. : 10/111960
DATED : October 21, 2008
INVENTOR(S) : Timothy John Clarke It is certified that error appears in the above-identified patent and that said Letters Patent is hereby corrected as shown below:

On the face of the patent, (57) ABSTRACT, line 4, after "representations" delete ",".
Column 1, line 60, "designer" should read --designers--.
Column 2, line 3, "tyres" should read --tires--.
Column 2, line 4, "tyres" should read --tires--.
Column 2, line 67, "disjoint" should read --disjointed--.
Column 4, line 60, "do" should read --to--.
Column 6, line 2, after "detail" delete ",".
Column 6, line 64, "an" should read --a--.
Column 7, line 29, "it" should read --is--.
Column 7, line 35, "is" should read --are--.
Column 7, line 47, "an" should read --a--.
Column 8, line 7, "an", second occurrence, should read --a--.
Column 12, line 17, after "lie" insert --in--.
Column 14, line 65, "are" should read --is--.
Column 17, line 64, "exists" should read --exist--.
Column 20, line 43, "oneanother" should read --one another--.
Column 24, line 28, "view-point" should read --viewpoint--.
Column 25, line 7, "view-point" should read --viewpoint--.
Column 25, line 48, "leaf sized" should read --leaf-sized--.
Column 25, line 57, "it" should read --is--.
Column 27, line 49, delete "corresponding".

Signed and Sealed this

Eighth Day of December, 2009

David J. Kappos
*Director of the United States Patent and Trademark Office*